US012660074B2

(12) United States Patent
Arita

(10) Patent No.: US 12,660,074 B2
(45) Date of Patent: Jun. 16, 2026

(54) ACTIVE GAS GENERATION APPARATUS

(71) Applicant: TOSHIBA MITSUBISHI-ELECTRIC INDUSTRIAL SYSTEMS CORPORATION, Tokyo (JP)

(72) Inventor: Ren Arita, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 28 days.

(21) Appl. No.: 18/868,181

(22) PCT Filed: May 1, 2023

(86) PCT No.: PCT/JP2023/017030
§ 371 (c)(1),
(2) Date: Nov. 22, 2024

(87) PCT Pub. No.: WO2024/228233
PCT Pub. Date: Nov. 7, 2024

(65) Prior Publication Data

US 2025/0331093 A1 Oct. 23, 2025

(51) Int. Cl.
*H05H 1/24* (2006.01)

(52) U.S. Cl.
CPC ................................. *H05H 1/2406* (2013.01)

(58) Field of Classification Search
CPC ............. H01J 37/32568; H01J 37/3244; H01J 37/32348; H05H 1/24; H05H 1/2406
See application file for complete search history.

(56) References Cited

U.S. PATENT DOCUMENTS

| | | | | |
|---|---|---|---|---|
| 2020/0343078 | A1* | 10/2020 | Watanabe | C23C 16/50 |
| 2021/0057192 | A1* | 2/2021 | Arita | H01J 37/32357 |
| 2022/0046781 | A1* | 2/2022 | Watanabe | H01J 37/32541 |
| 2022/0059322 | A1* | 2/2022 | Arita | H01J 37/32541 |

FOREIGN PATENT DOCUMENTS

WO 2019/138456 A1 7/2019

OTHER PUBLICATIONS

International Search Report and Written Opinion mailed on Jul. 11, 2023, received for PCT Application PCT/JP2023/017030, filed on May 1, 2023, 8 pages including English Translation.
U.S. Appl. No. 18/711,758, filed May 20, 2024, pp. 1-3.

* cited by examiner

*Primary Examiner* — Patrick C Chen
(74) *Attorney, Agent, or Firm* — XSENSUS LLP

(57) ABSTRACT

An electrode unit in an active gas generation apparatus according to the present disclosure includes a ground conductor provided to a lower side of a ground side electrode constituting part. A chassis bottom part of a chassis includes a chassis opening part, and the chassis opening part includes a lower side tapered region having a larger opening area with decreasing distance to a lower side and an upper side region. A plurality of gas ejection ports provided in the ground conductor are provided to get closer to each other with decreasing distance to the lower side so that plural pieces of partial active gas collide with each other in a collision region, and the collision region is located in the lower side tapered region or in the upper side region on an upper side of the lower side tapered region.

4 Claims, 28 Drawing Sheets

ACTIVE GAS GENERATION APPARATUS

CROSS-REFERENCE TO RELATED APPLICATION

This application is a national stage application, pursuant to 35 U.S.C. § 371, of International Patent Application No. PCT/JP2023/017030, filed May 1, 2023, the entire contents of which are incorporated herein by reference.

TECHNICAL FIELD

The present disclosure relates to an active gas generation apparatus having a parallel plate type electrode structure and generating active gas using dielectric barrier discharge.

BACKGROUND ART

In a conventional active gas generation apparatus with a parallel plate type electrode structure in which a dielectric barrier discharge is adopted, a gap between a metal electrode (electrode conductive film) and a dielectric film (electrode dielectric film) facing each other or a gap between dielectric films facing each other serves as a discharge space.

Adopted to the conventional active gas generation apparatus is a parallel plate type dielectric barrier discharge in which a dielectric barrier discharge is generated in a discharge space, and material gas injected in the discharge space is activated to generate the active gas.

For example, an active gas generation apparatus disclosed in Patent Document 1 is an example of an active gas generation apparatus in which the parallel plate type dielectric barrier discharge is adopted.

The active gas generally has a short lifetime as active gas (a period of time during which the active gas keeps high reactivity), thus the active gas needs to be supplied to a space where the active gas is to be used in a short time. The active gas is also inactivated when colliding with the other material, thus it is not preferable to supply the active gas to a space where the active gas is to be used through a meandering pipe, for example.

Thus, when a processed object (an object onto which the active gas is blown) is large in a processing space where the active gas is to be used, applied in a conventional active gas generation apparatus are a first improvement structure of providing a plurality of gas ejection ports in positions relatively close to a processing space where the active gas is to be used and a second improvement structure including a plurality of discharge spaces corresponding to the plurality of gas ejection ports.

PRIOR ART DOCUMENTS

Patent Document(s)

Patent Document 1: International Publication No. 2019/138456

SUMMARY

Problem to be Solved by the Invention

A method of providing a plurality of gas ejection ports in one dielectric film is adopted to the first improvement structure described above. However, the active gas ejected from each of the plurality of gas ejection ports basically has only one directionality, thus there is a problem that the active gas cannot be uniformly supplied to a processing space where a processed object is disposed inside.

In the manner similar to the first improvement structure, also in the second improvement structure described above, the active gas ejected from each of the plurality of gas ejection ports basically has only one directionality, thus there is a problem that the active gas cannot be uniformly supplied to a processing space.

An object of the present disclosure is to solve the above problems, and provide an active gas generation apparatus capable of uniformly supplying active gas to a processing space.

Means to Solve the Problem

An active gas generation apparatus according to the present disclosure is an active gas generation apparatus activating material gas supplied to a discharge space to generate active gas, comprising: an electrode unit; and a chassis housing the electrode unit in a chassis space and having conductivity, wherein the chassis includes a chassis bottom part including a flat surface and a conductor housing space concaved from the flat surface in a depth direction, the electrode unit includes: a first electrode constituting part; a second electrode constituting part provided to a lower side of the first electrode constituting part; and a reference potential conductor provided to a lower side of the second electrode constituting part to be housed in the conductor housing space, the first electrode constituting part includes a first electrode dielectric film and a first electrode conductive film formed on an upper surface of the first electrode dielectric film, the second electrode constituting part includes a second electrode dielectric film and a second electrode conductive film formed on a lower surface of the second electrode dielectric film, the reference potential conductor includes an active gas buffer space in an upper portion, and the second electrode constituting part is disposed to cover the active gas buffer space, the second electrode dielectric film includes a dielectric through port passing through the second electrode dielectric film in a region overlapped with the active gas buffer space in a plan view, the second electrode conductive film includes a conductive film opening part in a region overlapped with the active gas buffer space in a plan view, and the conductive film opening part is overlapped with the dielectric through port in a plan view, a space where the first electrode dielectric film and the second electrode dielectric film face each other is regulated as a main dielectric space, the discharge space includes a main discharge space as a region which the first and second electric conductive films are overlapped with each other in a plan view in the main dielectric space, alternating current voltage is applied to the first electrode conductive film, and the second electrode conductive film is set to have reference potential via the chassis and the reference potential conductor, the active gas generation apparatus further includes a plurality of gas ejection ports each provided to pass through the reference potential conductor from a bottom surface of the active gas buffer space, the plurality of gas ejection ports not being overlapped with the dielectric through port in a plan view, the discharge space includes an auxiliary discharge space including the dielectric through port and a part of the active gas buffer space in addition to the main discharge space, active gas outputted from the plurality of gas ejection ports is regulated as plural pieces of partial active gas, the chassis bottom part of the chassis includes a chassis opening part in a region overlapped with the active gas buffer space in a plan view, and the plural pieces of partial active gas are introduced to a lower side through the chassis opening part, the chassis opening part includes a tapered region having a tapered shape with increasing opening area with decreasing distance to a lower side, and the plurality of gas ejection ports are provided to get closer to each other with decreasing distance to a lower side so that the plural pieces of partial active gas collide with each other in a collision region, and the collision region is located in the tapered region or on an upper side of the tapered region.

Effects of the Invention

The plurality of gas ejection ports in the active gas generation apparatus according to the present disclosure has the characteristics described above. Thus, the plural pieces of partial active gas collide with each other in the collision region, thus a direction of a flow of each of the plural pieces of active gas is diffused to a plurality of diffusion directions from one direction.

The collision region is located in the tapered region or on the upper side of the tapered region, thus the plural pieces of partial active gas each diffused flow in a direction along the tapered shape of the tapered region with decreasing distance to the lower side.

Accordingly, the active gas including the plural pieces of partial active gas is diffused and flows in the direction along the tapered shape from the tapered region toward the processing space on the lower side. As a result, the active gas generation apparatus according to the present disclosure can uniformly supply active gas to the processing space.

These and other objects, features, aspects and advantages of the present disclosure will become more apparent from the following detailed description of the present disclosure when taken in conjunction with the accompanying drawings.

DESCRIPTION OF EMBODIMENT(S)

Embodiment 1

Figure 1:
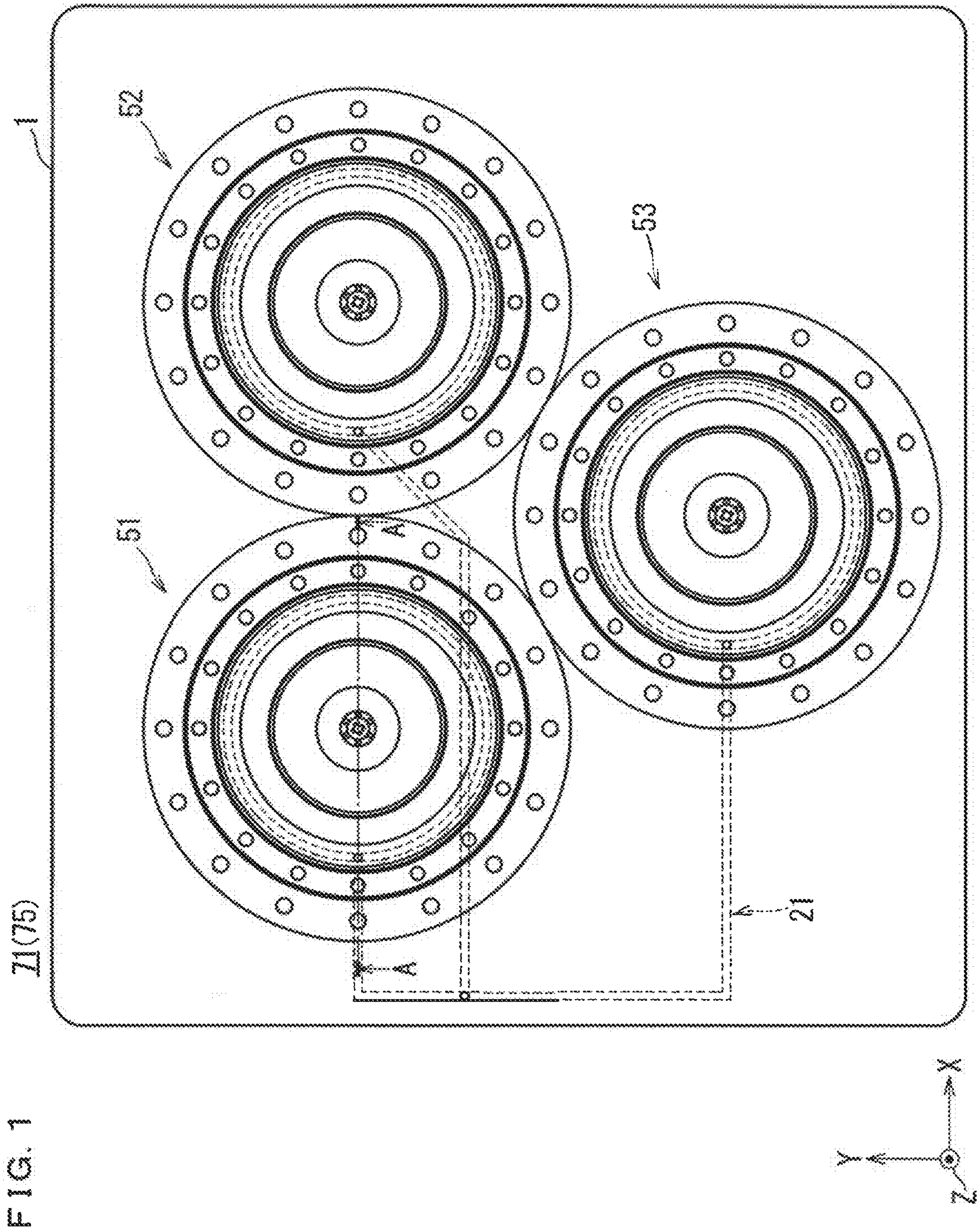
FIG. 1 is a plan view schematically illustrating a planar structure of an active gas generation apparatus as an embodiment 1.

FIG. 1 is a plan view schematically illustrating a planar structure of an active gas generation apparatus 71 as an embodiment 1 according to the present disclosure.

As illustrated in FIG. 1, three electrode units 51 to 53 are housed in a chassis 1 in the active gas generation apparatus 71. Material gas G1 is supplied to each of the electrode units 51 to 53 through a gas flow path 21. Each of the electrode units 51 to 53 activates the material gas G1 supplied to a discharge space 4 to generate active gas G2.

Figure 2:
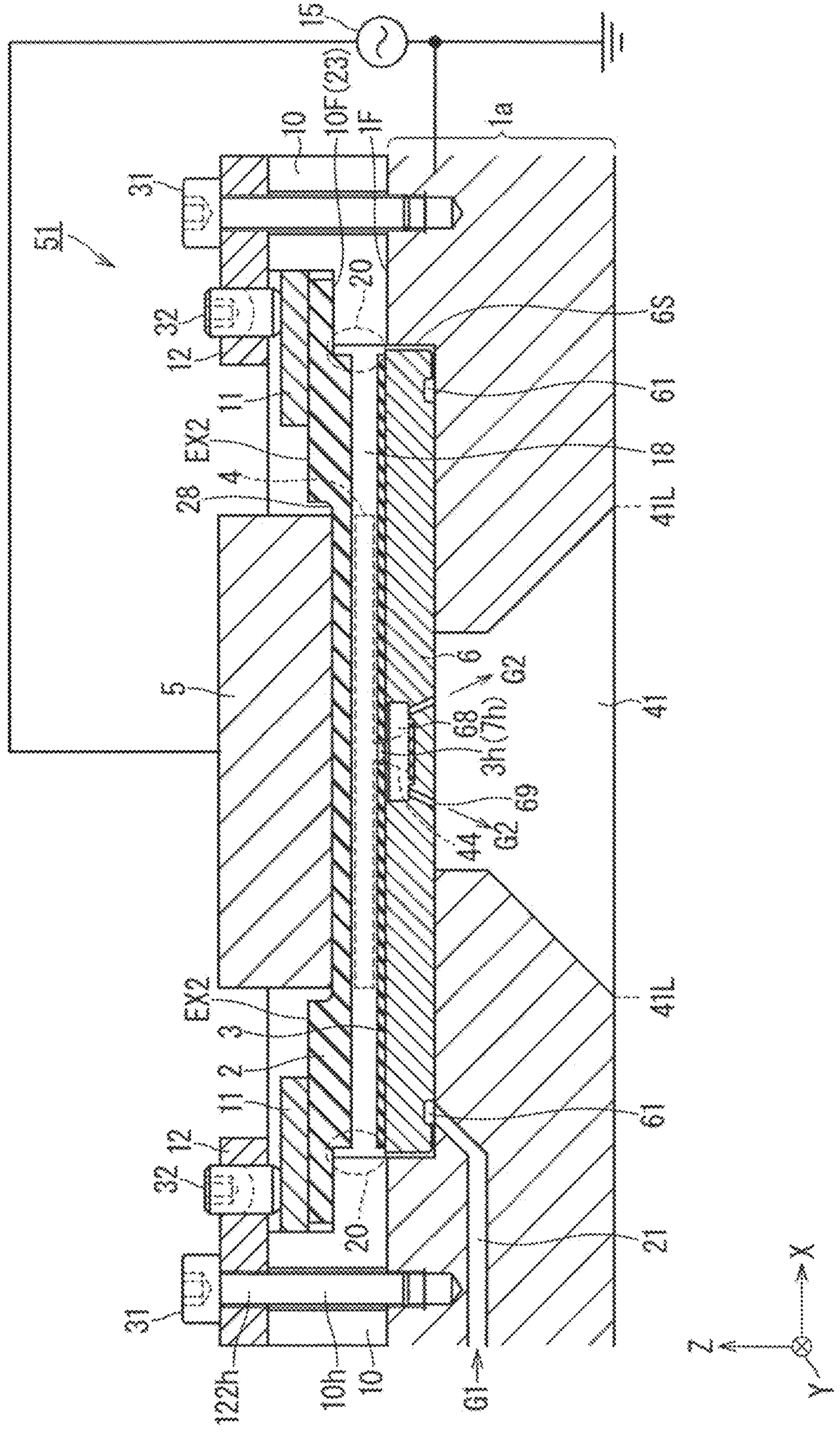
FIG. 2 is a cross-sectional view illustrating a cross-section structure of an A-A cross section in FIG. 1.

FIG. 2 is a cross-sectional view illustrating a cross-section structure of an A-A cross section in FIG. 1. FIG. 3 to FIG. 6 are explanation diagrams each partially illustrating a structure of an electrode unit 50. The electrode unit 50 corresponds to any of the electrode units 51 to 53. The electrode units 51 to 53 have the same structure as each other.

Figure 3:
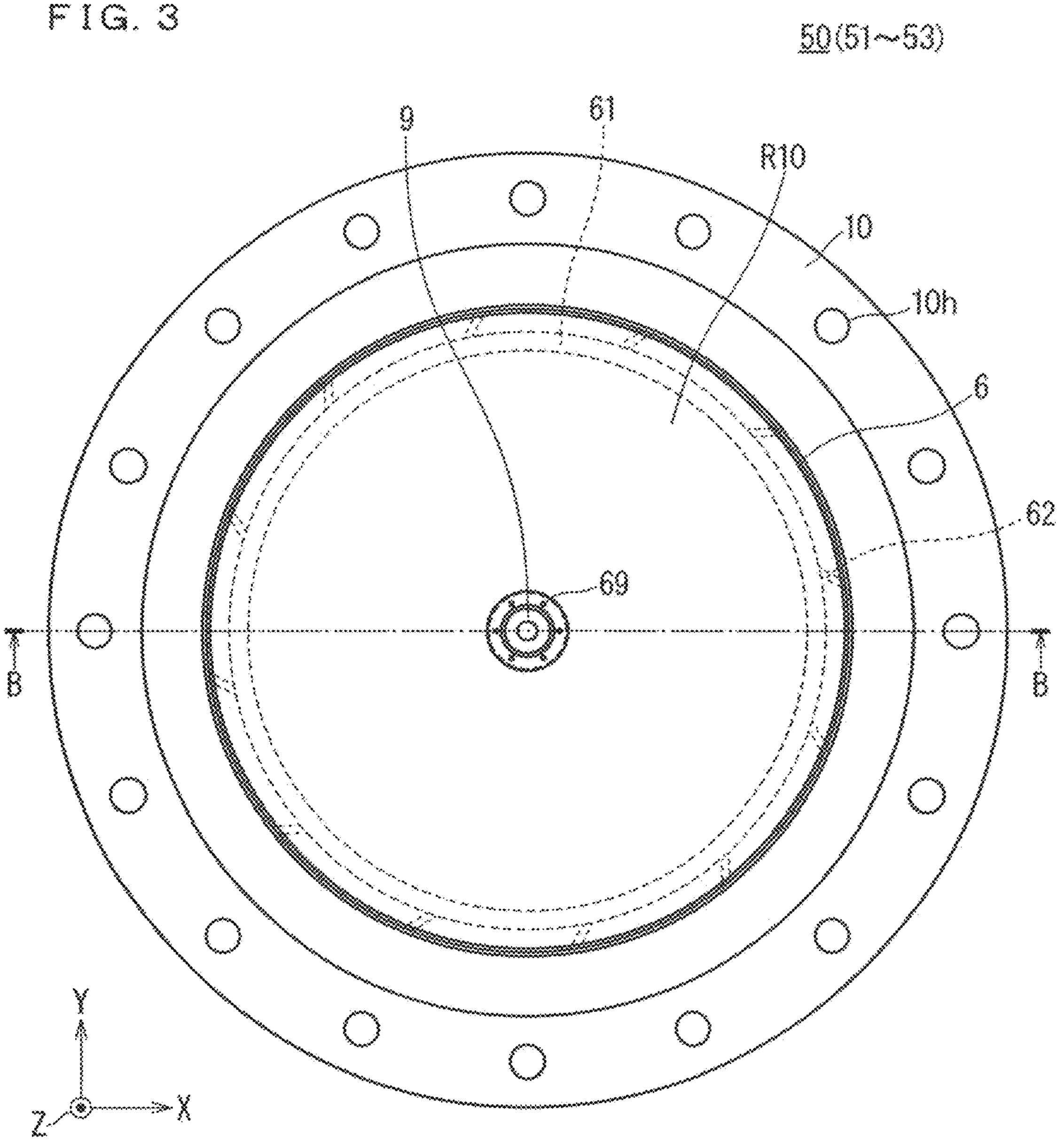
FIG. 3 is an explanation diagram (No. 1) schematically illustrating a planar structure of an electrode unit.
Figure 4:
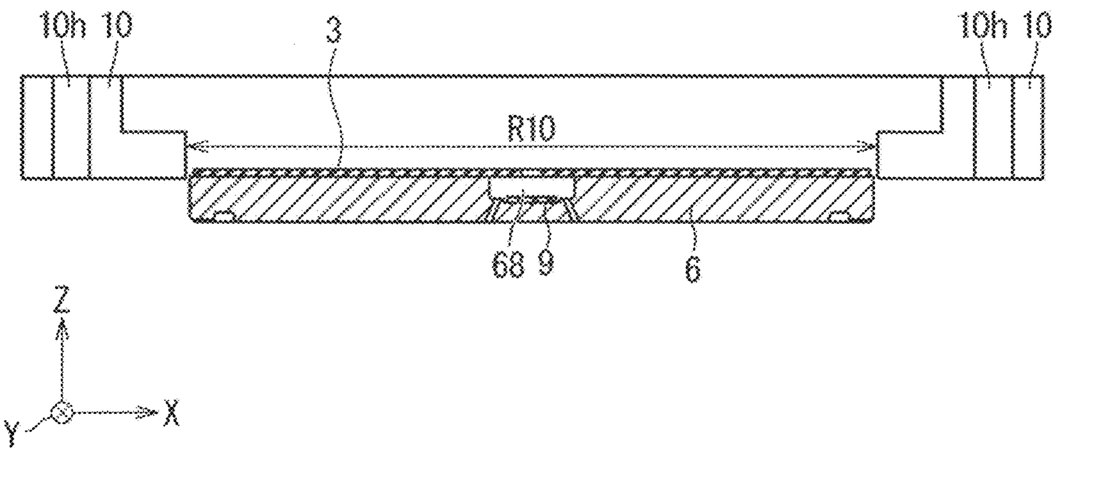
FIG. 4 is an explanation diagram illustrating a cross-section structure of a B-B cross section in FIG. 3.

FIG. 3 is an explanation diagram schematically illustrating a planar structure of the electrode unit 50. FIG. 4 is an explanation diagram illustrating a cross-section structure of a B-B cross section in FIG. 3. Each of FIG. 3 and FIG. 4 is a first explanation diagram illustrating a structure of a ground conductor 6 and an area around the ground conductor 6.

Figure 5:
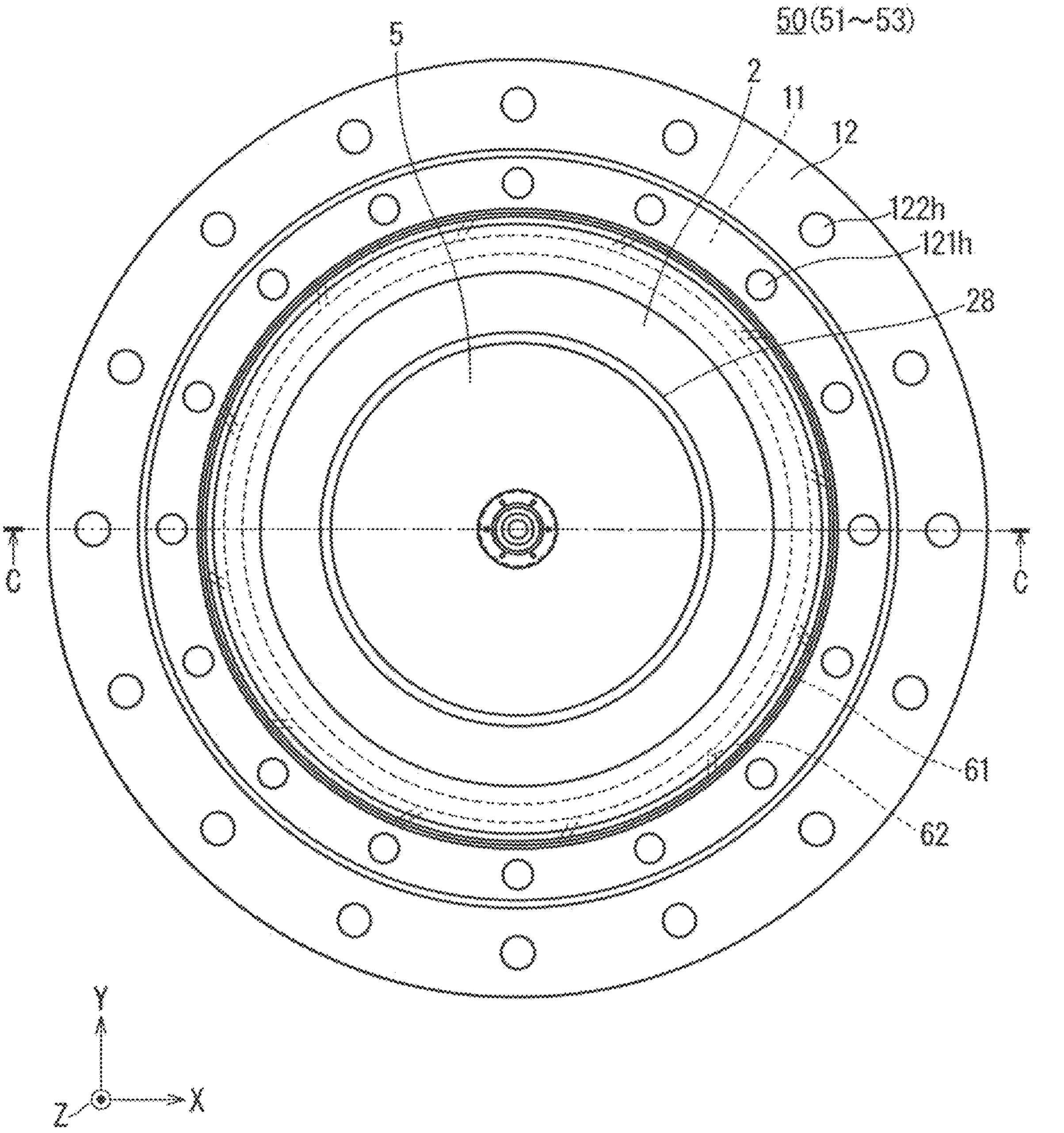
FIG. 5 is an explanation diagram (No. 2) schematically illustrating a planar structure of the electrode unit.
Figure 6:
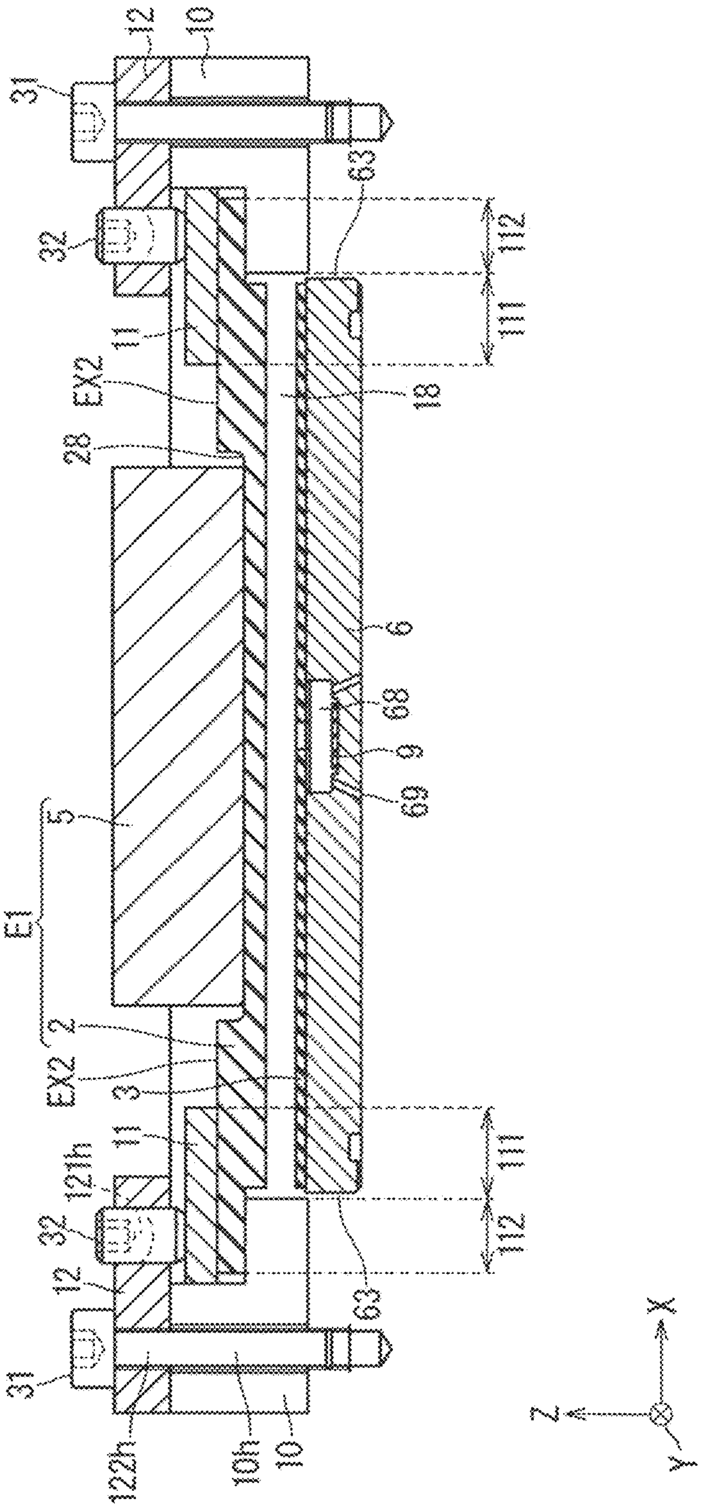
FIG. 6 is an explanation diagram illustrating a cross-section structure of a C-C cross section in FIG. 5.

FIG. 5 is an explanation diagram schematically illustrating a planar structure of the electrode unit 50. FIG. 6 is an explanation diagram illustrating a cross-section structure of a C-C cross section in FIG. 5. Each of FIG. 5 and FIG. 6 is a second explanation diagram illustrating a detailed structure of the ground conductor 6 and the area around the ground conductor 6.

Figure 7:
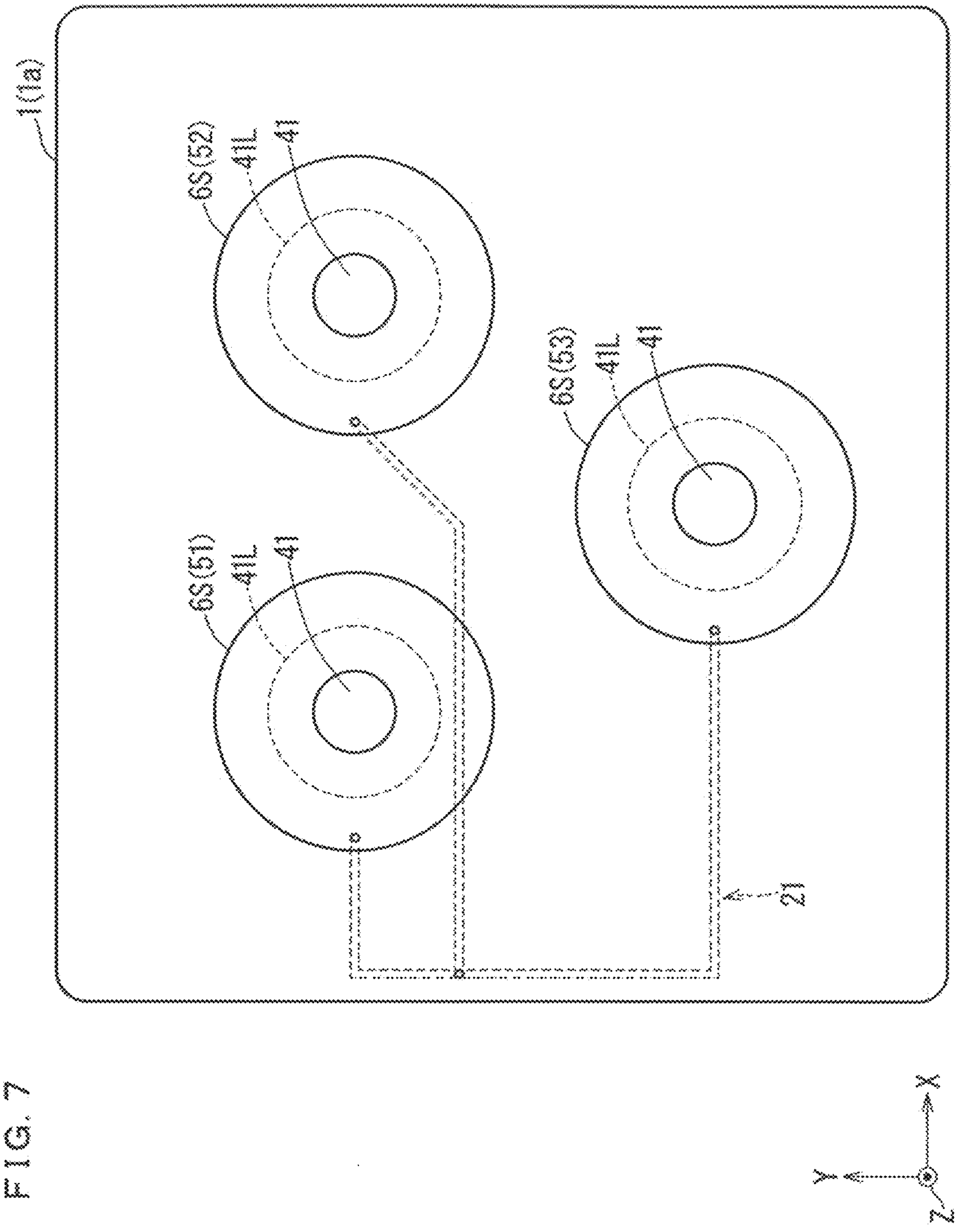
FIG. 7 is an explanation diagram schematically illustrating a planar structure of a chassis.
Figure 8:
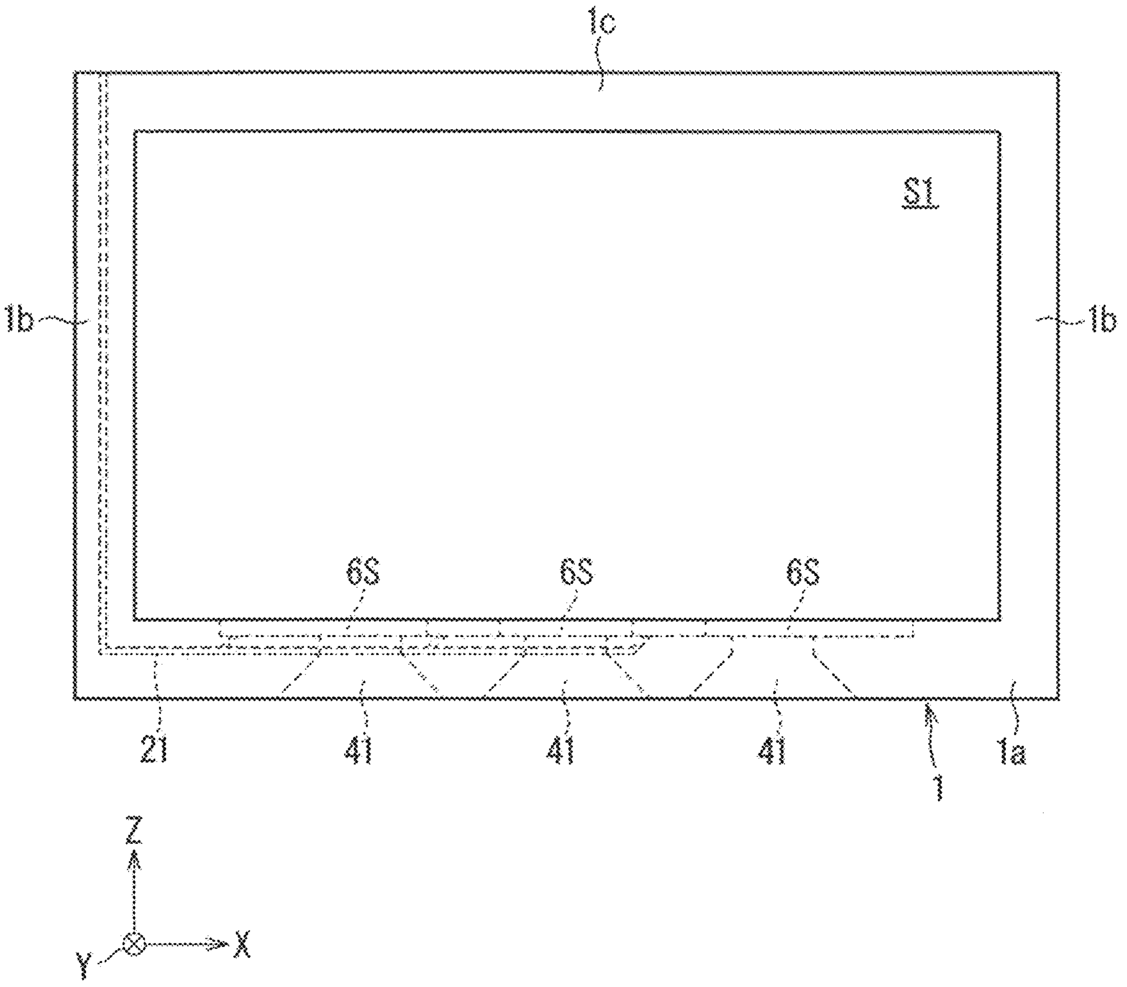
FIG. 8 is an explanation diagram schematically illustrating a planar structure of the chassis.

FIG. 7 to FIG. 30 are explanation diagrams each illustrating details of constituent components of the electrode unit 50. FIG. 7 and FIG. 8 are explanation diagrams each schematically illustrating a structure of the chassis 1. FIG. 7 illustrates a planar structure of the chassis 1, and FIG. 8 illustrates a cross-section structure of the chassis 1.

Figure 9:
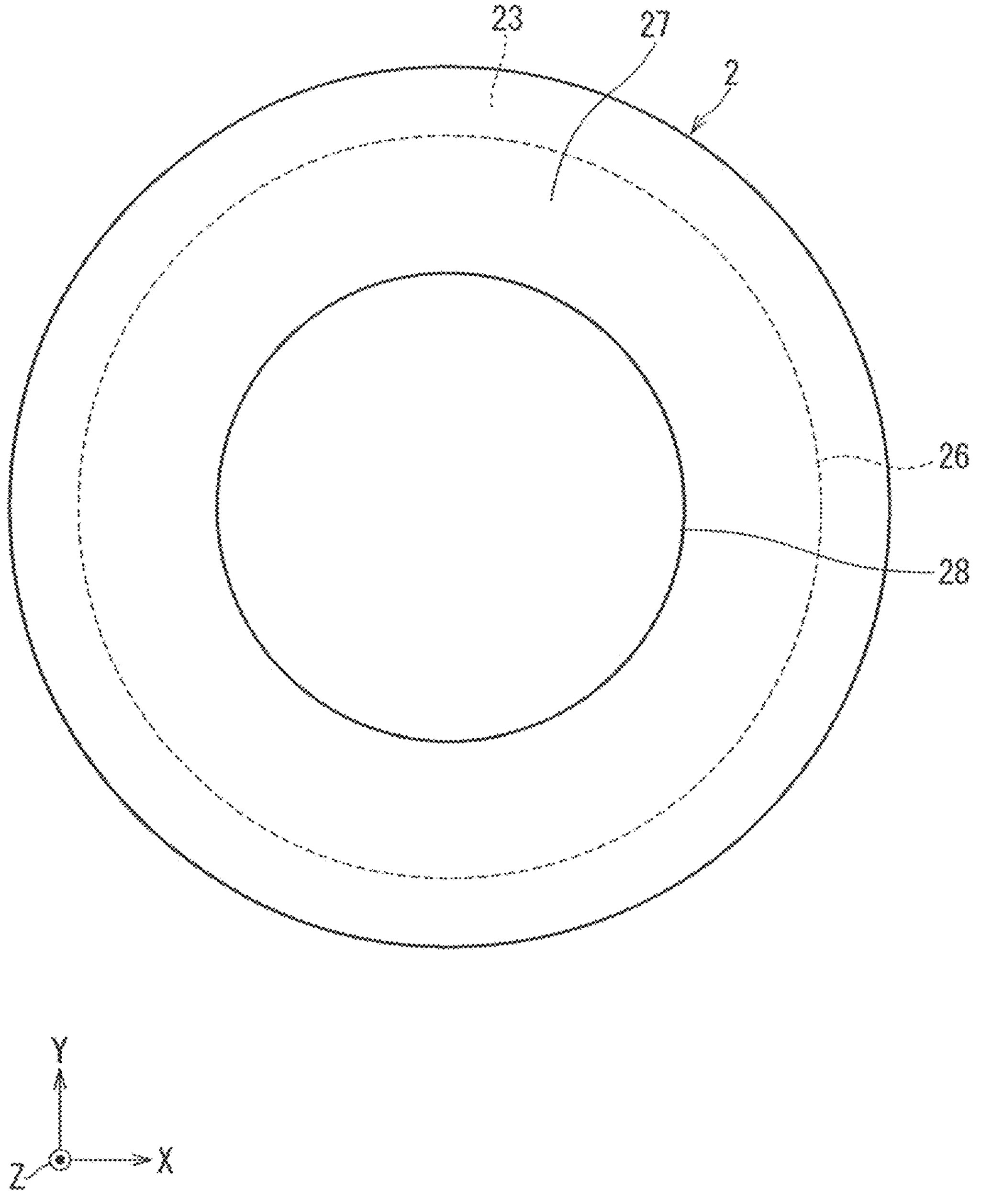
FIG. 9 is an explanation diagram schematically illustrating a planar structure of a high voltage side dielectric film.
Figure 10:
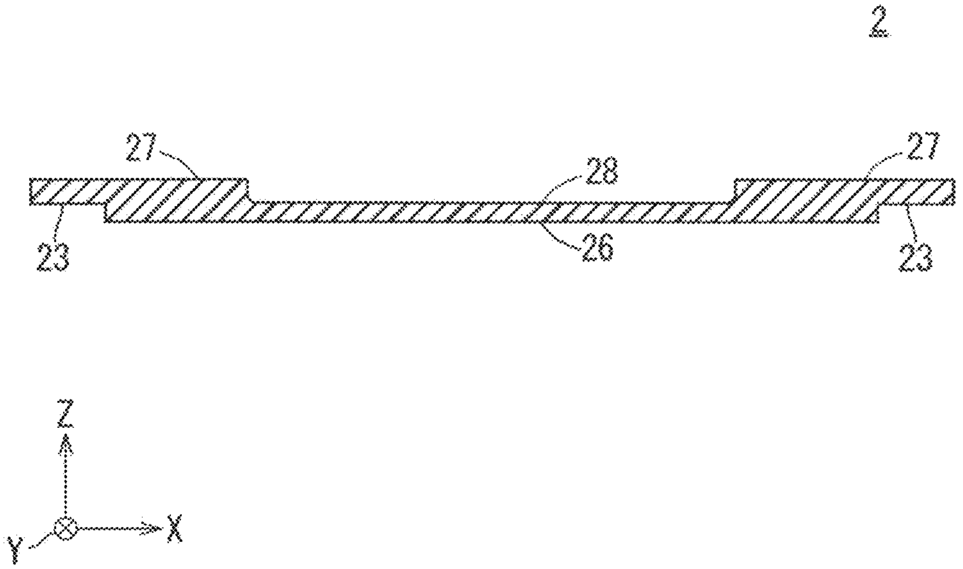
FIG. 10 is an explanation diagram schematically illustrating a cross-section structure of the high voltage side dielectric film.

FIG. 9 and FIG. 10 are explanation diagrams each schematically illustrating a structure of a high voltage side dielectric film 2. FIG. 9 illustrates a planar structure of the high voltage side dielectric film 2, and FIG. 10 illustrates a cross-section structure of the high voltage side dielectric film 2.

Figure 11:
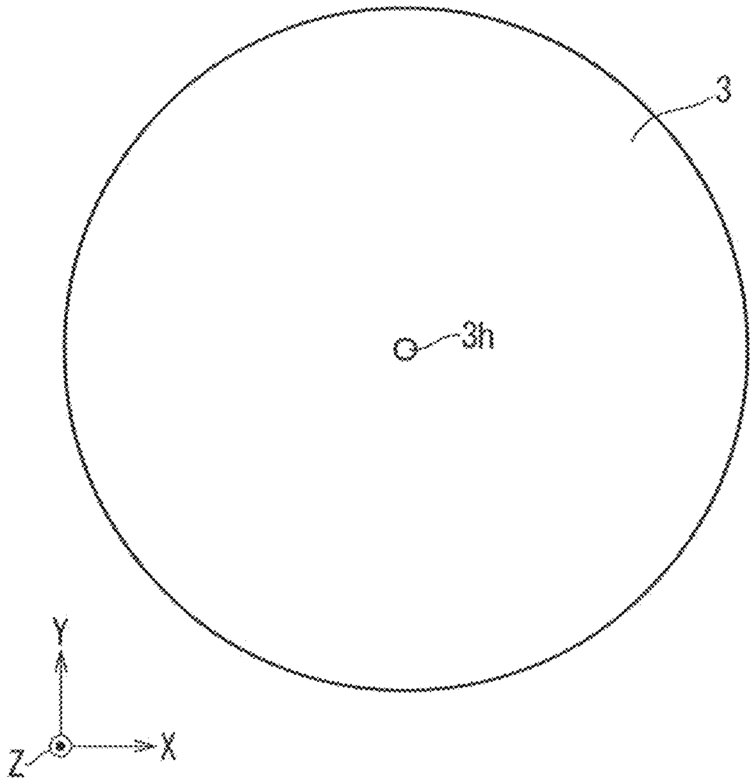
FIG. 11 is an explanation diagram schematically illustrating a planar structure of a ground side dielectric film.
Figure 12:
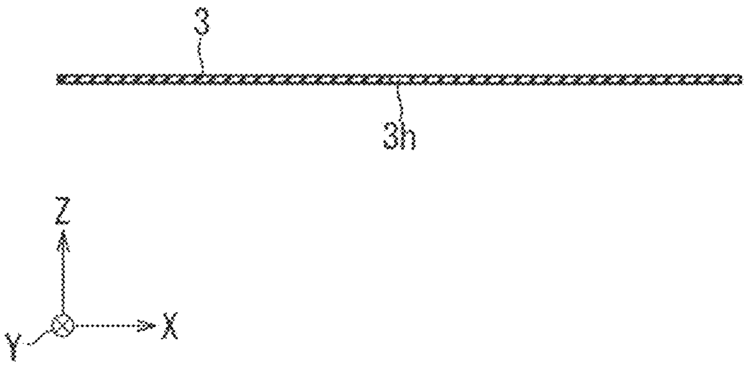
FIG. 12 is an explanation diagram schematically illustrating a cross-section structure of the ground side dielectric film.

FIG. 11 and FIG. 12 are explanation diagrams each schematically illustrating a structure of a ground side dielectric film 3. FIG. 11 illustrates a planar structure of the ground side dielectric film 3, and FIG. 12 illustrates a cross-section structure of the ground side dielectric film 3.

Figure 13:
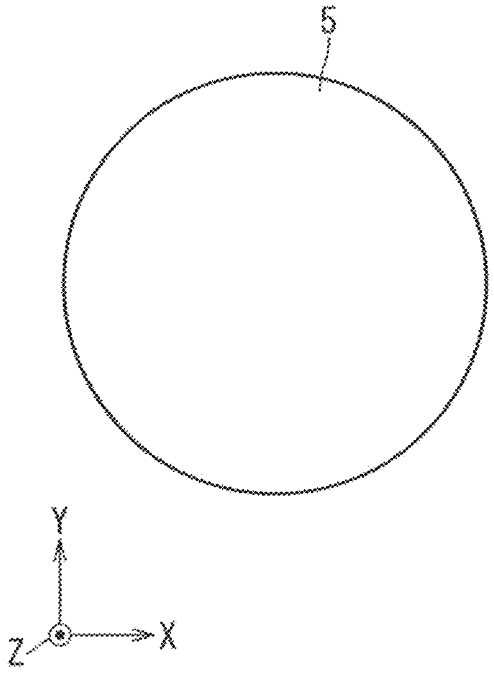
FIG. 13 is an explanation diagram schematically illustrating a planar structure of a power supply body.
Figure 14:
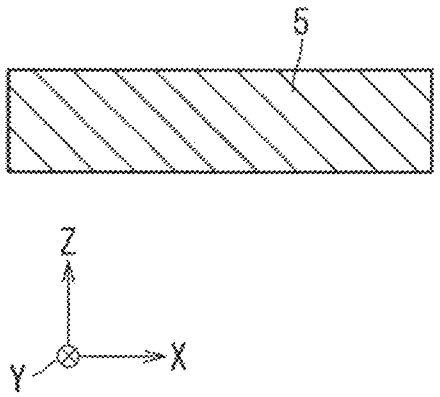
FIG. 14 is an explanation diagram schematically illustrating a cross-section structure of the power supply body.

FIG. 13 and FIG. 14 are explanation diagrams each schematically illustrating a structure of a power supply body 5. FIG. 13 illustrates a planar structure of the power supply body 5, and FIG. 14 illustrates a cross-section structure of the power supply body 5.

Figure 15:
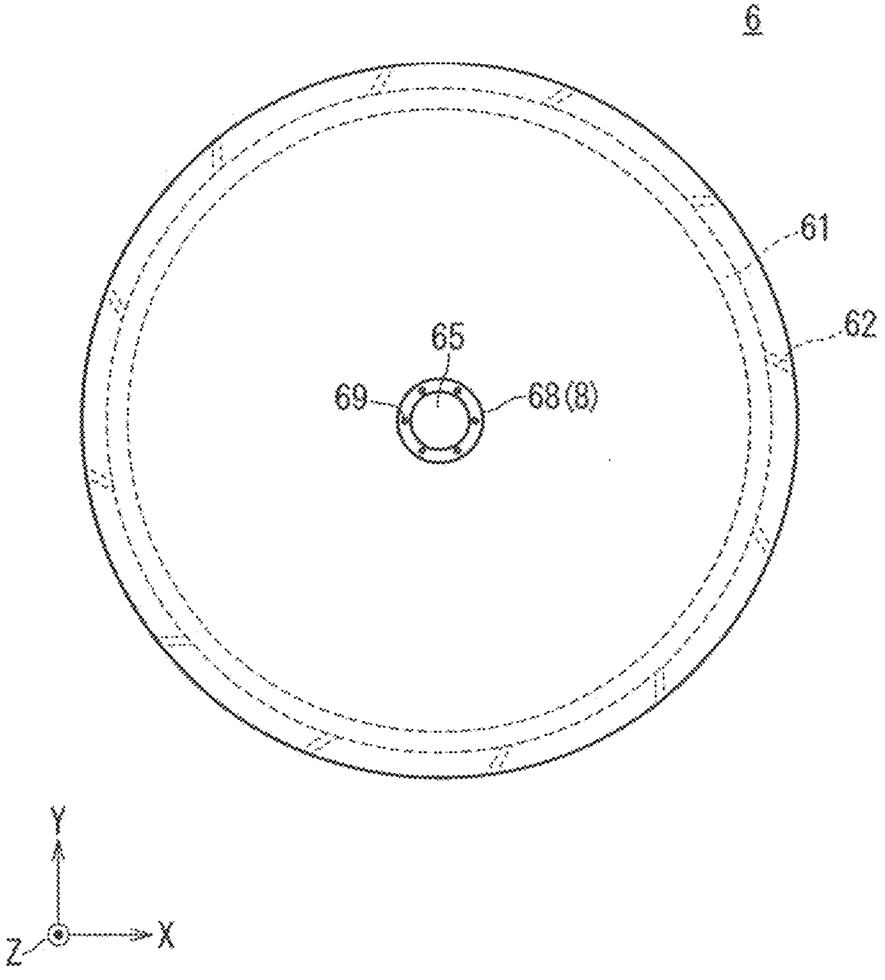
FIG. 15 is an explanation diagram schematically illustrating a planar structure of a ground conductor.
Figure 16:
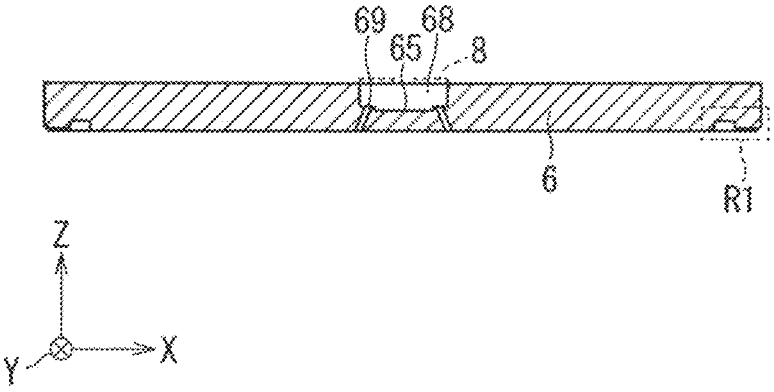
FIG. 16 is an explanation diagram schematically illustrating a cross-section structure of the ground conductor.
Figure 17:
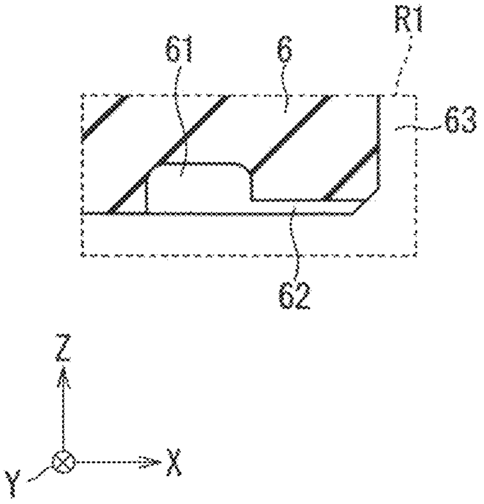
FIG. 17 is an explanation diagram illustrating details of a focus region in FIG. 16.

FIG. 15 and FIG. 17 are explanation diagrams each schematically illustrating a structure of the ground conductor 6. FIG. 15 illustrates a planar structure of the ground conductor 6, FIG. 16 illustrates a cross-section structure of the ground conductor 6, and FIG. 17 illustrates details of a focus region R1 in FIG. 16.

Figure 18:
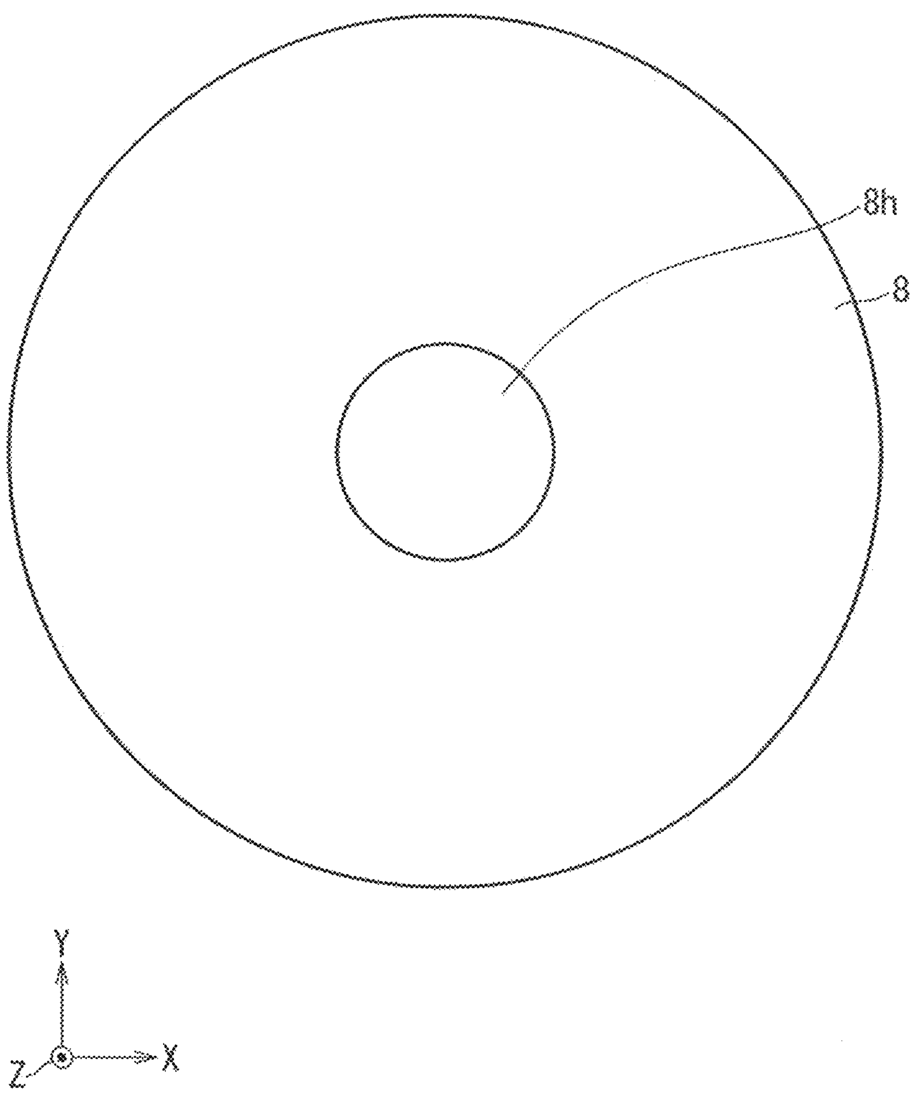
FIG. 18 is an explanation diagram schematically illustrating a planar structure of a cover dielectric film.
Figure 19:
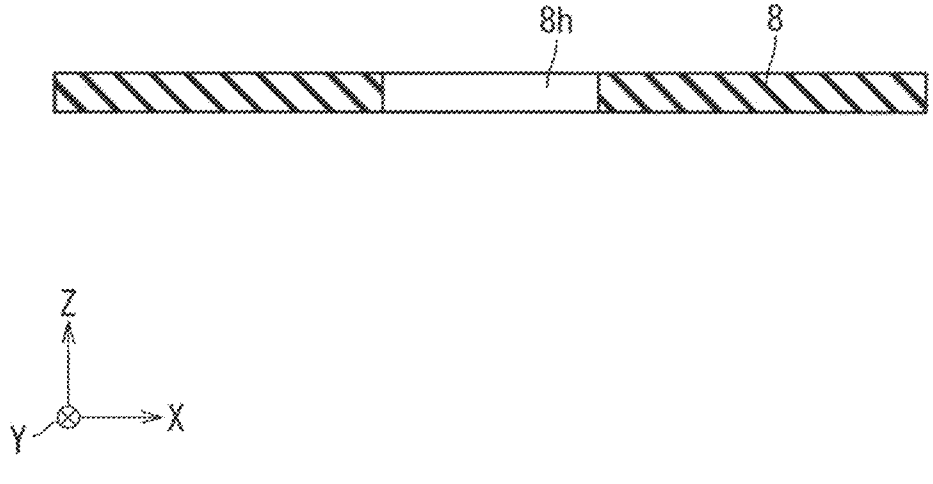
FIG. 19 is an explanation diagram schematically illustrating a cross-section structure of the cover dielectric film.

FIG. 18 and FIG. 19 are explanation diagrams each schematically illustrating a structure of a cover dielectric film 8. FIG. 18 illustrates a planar structure of the cover dielectric film 8, and FIG. 19 illustrates a cross-section structure of the cover dielectric film 8.

Figure 20:
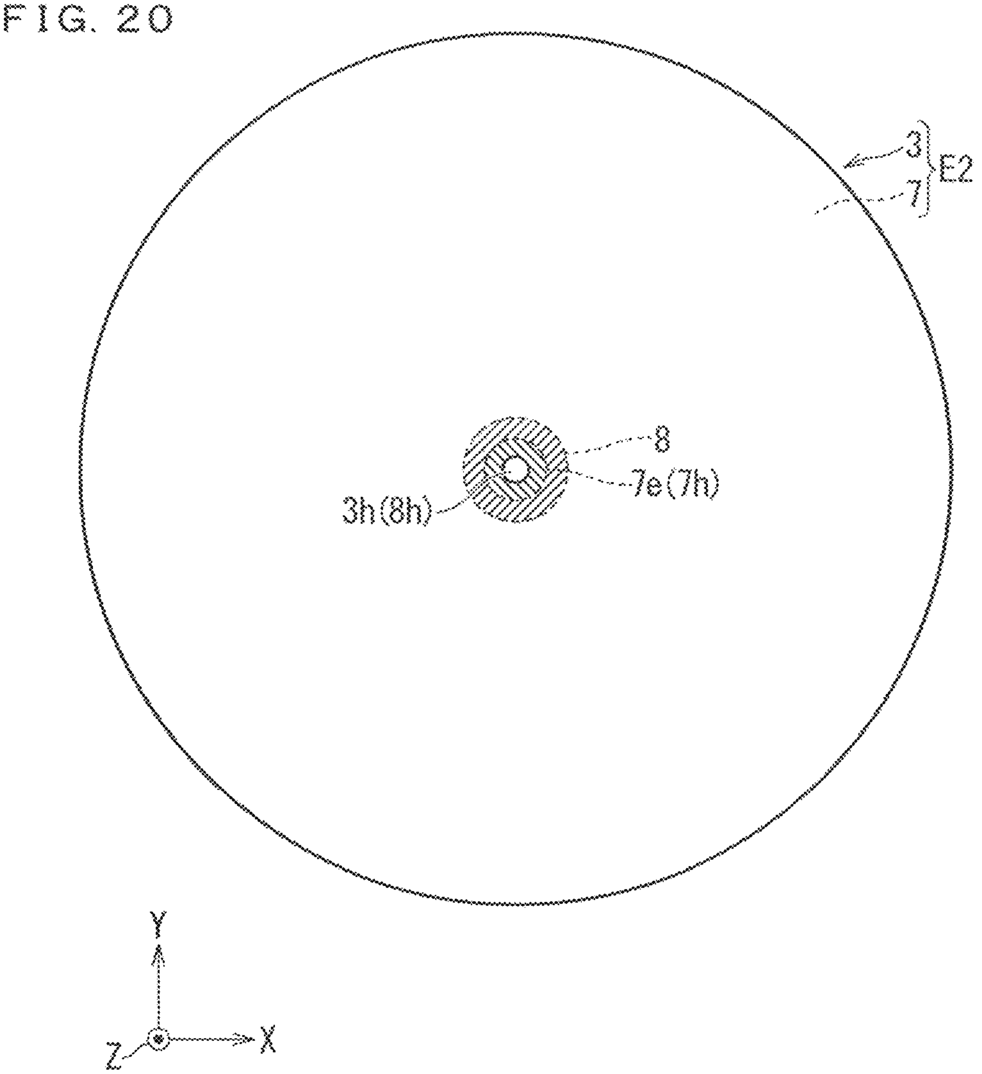
FIG. 20 is an explanation diagram schematically illustrating a planar structure of a ground side electrode constituting part.
Figure 21:
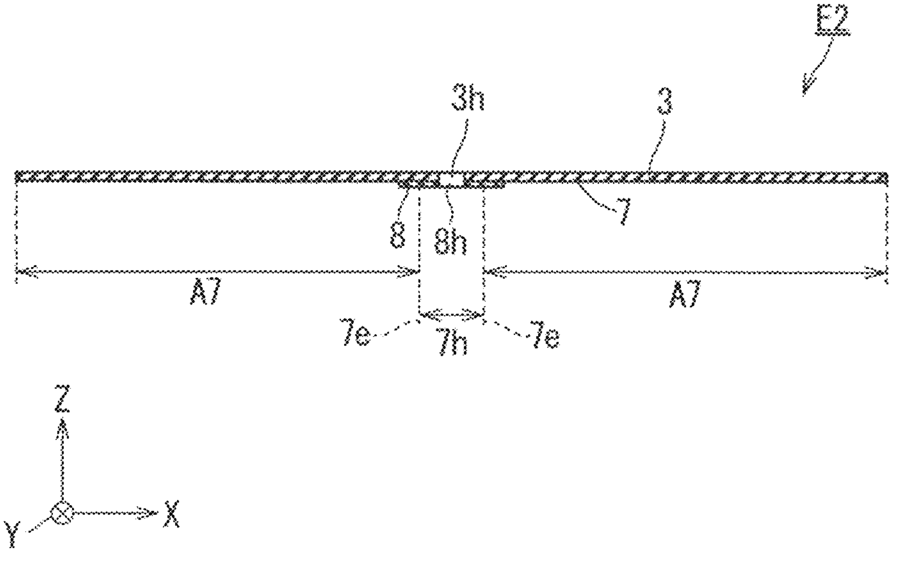
FIG. 21 is an explanation diagram schematically illustrating a cross-section structure of the ground side electrode constituting part.

FIG. 20 and FIG. 21 are explanation diagrams each schematically illustrating a structure of a ground side electrode constituting part E2. FIG. 20 illustrates a planar structure of the ground side electrode constituting part E2, and FIG. 21 illustrates a cross-section structure of the ground side electrode constituting part E2. The ground side electrode constituting part E2 includes a combination structure of the ground side dielectric film 3, a conductive film 7, and the cover dielectric film 8.

Figure 22:
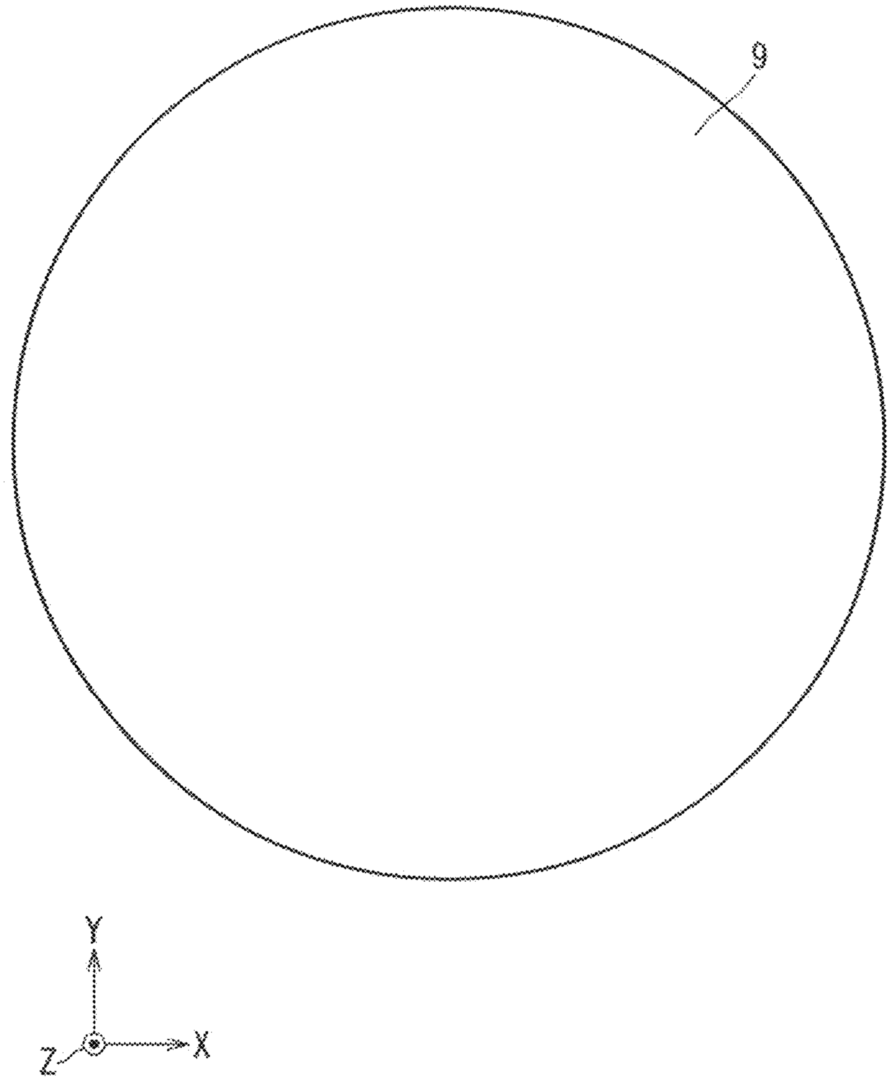
FIG. 22 is an explanation diagram schematically illustrating a planar structure of a shield dielectric film.
Figure 23:
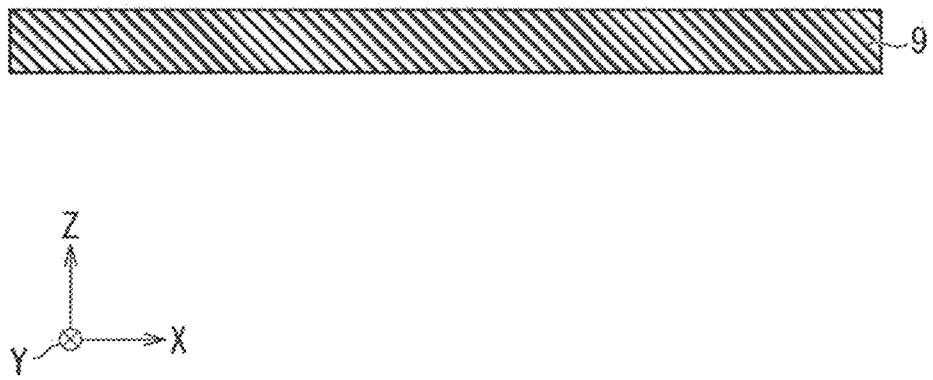
FIG. 23 is an explanation diagram schematically illustrating a cross-section structure of the shield dielectric film.

FIG. 22 and FIG. 23 are explanation diagrams each schematically illustrating a structure of a shield dielectric film 9. FIG. 22 illustrates a planar structure of the shield dielectric film 9, and FIG. 23 illustrates a cross-section structure of the shield dielectric film 9.

Figure 24:
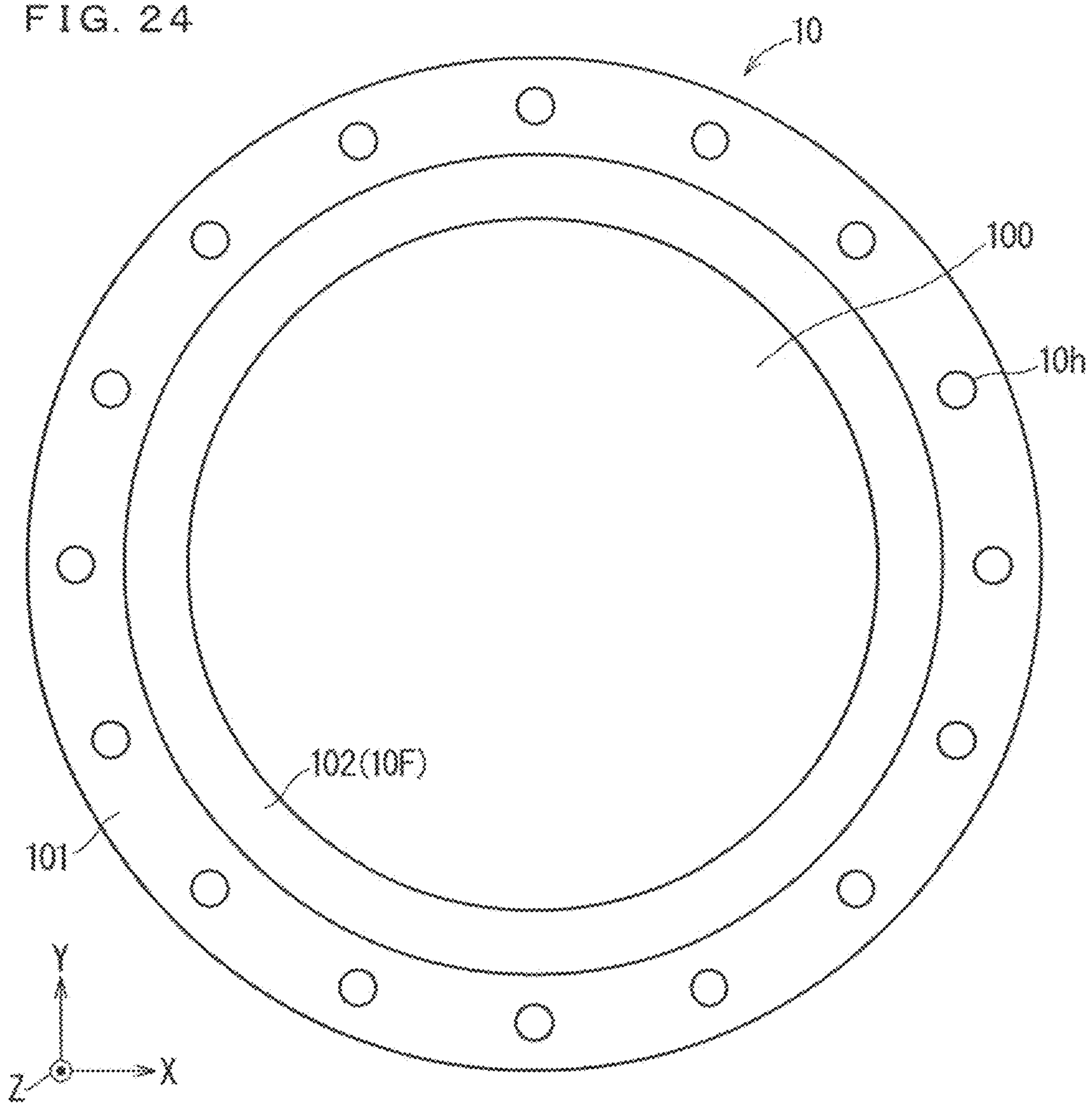
FIG. 24 is an explanation diagram schematically illustrating a planar structure of a dielectric film support member.
Figure 25:
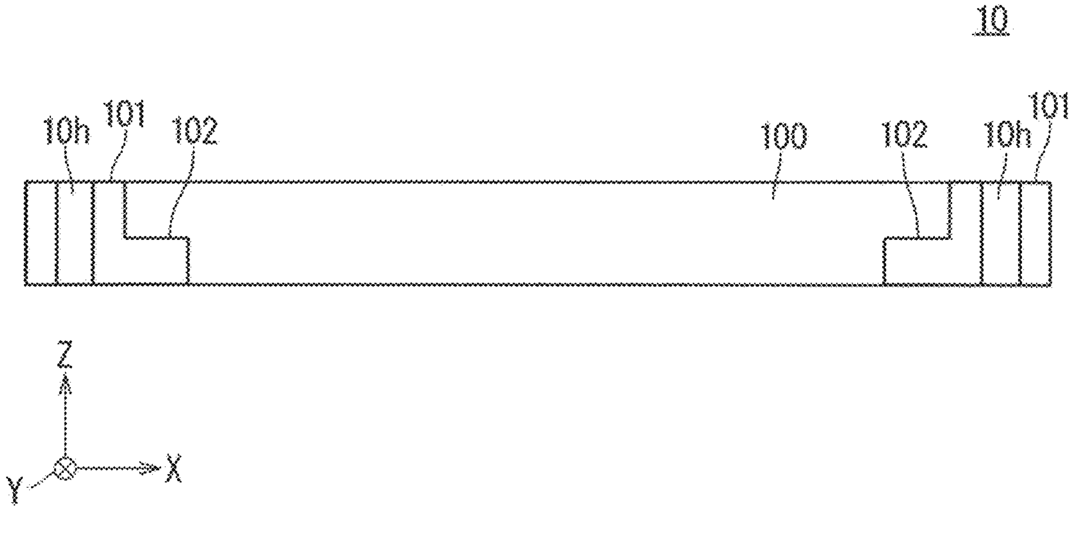
FIG. 25 is an explanation diagram schematically illustrating a cross-section structure of a dielectric film support member.

FIG. 24 and FIG. 25 are explanation diagrams each schematically illustrating a structure of a dielectric film support member 10. FIG. 24 illustrates a planar structure of the dielectric film support member 10, and FIG. 25 illustrates a cross-section structure of the dielectric film support member 10.

Figure 26:
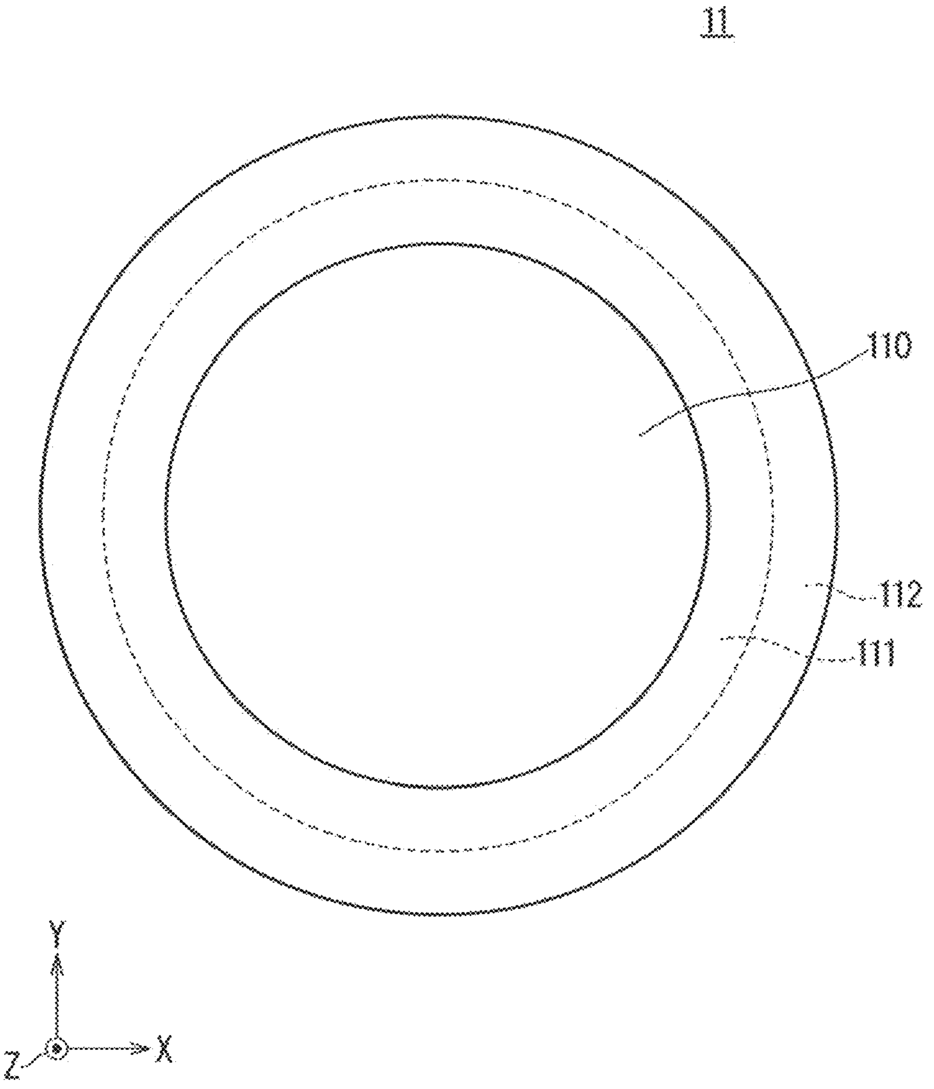
FIG. 26 is an explanation diagram schematically illustrating a planar structure of a dielectric film suppression member.
Figure 27:
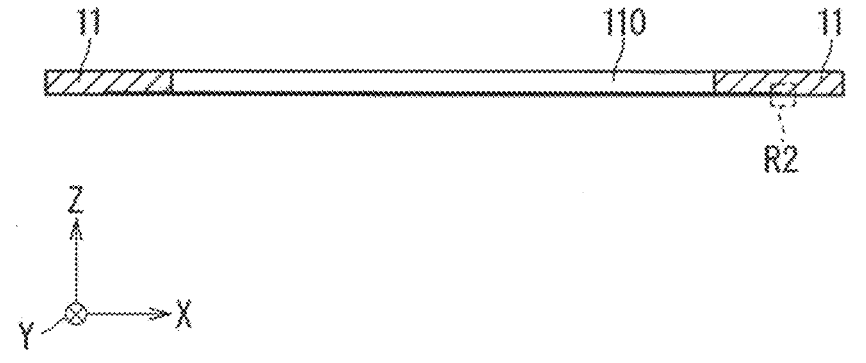
FIG. 27 is an explanation diagram schematically illustrating a cross-section structure of the dielectric film suppression member.
Figure 28:
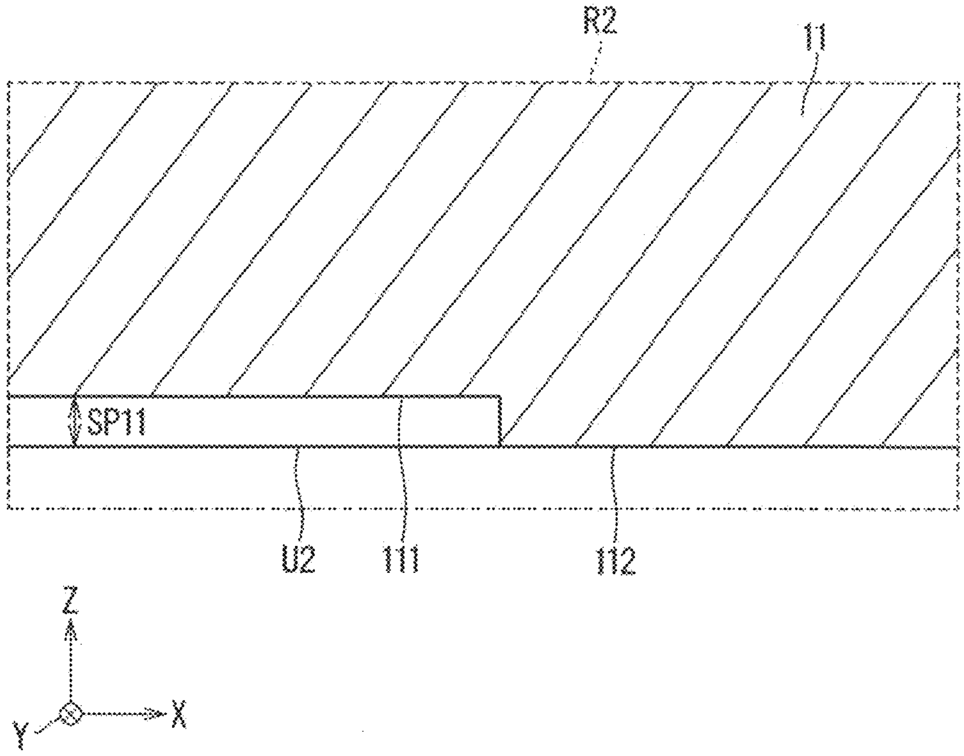
FIG. 28 is an explanation diagram illustrating details of a focus region in FIG. 27.

FIG. 26 to FIG. 28 are explanation diagrams each schematically illustrating a structure of a dielectric film suppression member 11. FIG. 26 illustrates a planar structure of the dielectric film suppression member 11, FIG. 27 illustrates a cross-section structure of the dielectric film suppression member 11, and FIG. 28 illustrates details of a focus region R2 in FIG. 27.

Figure 29:
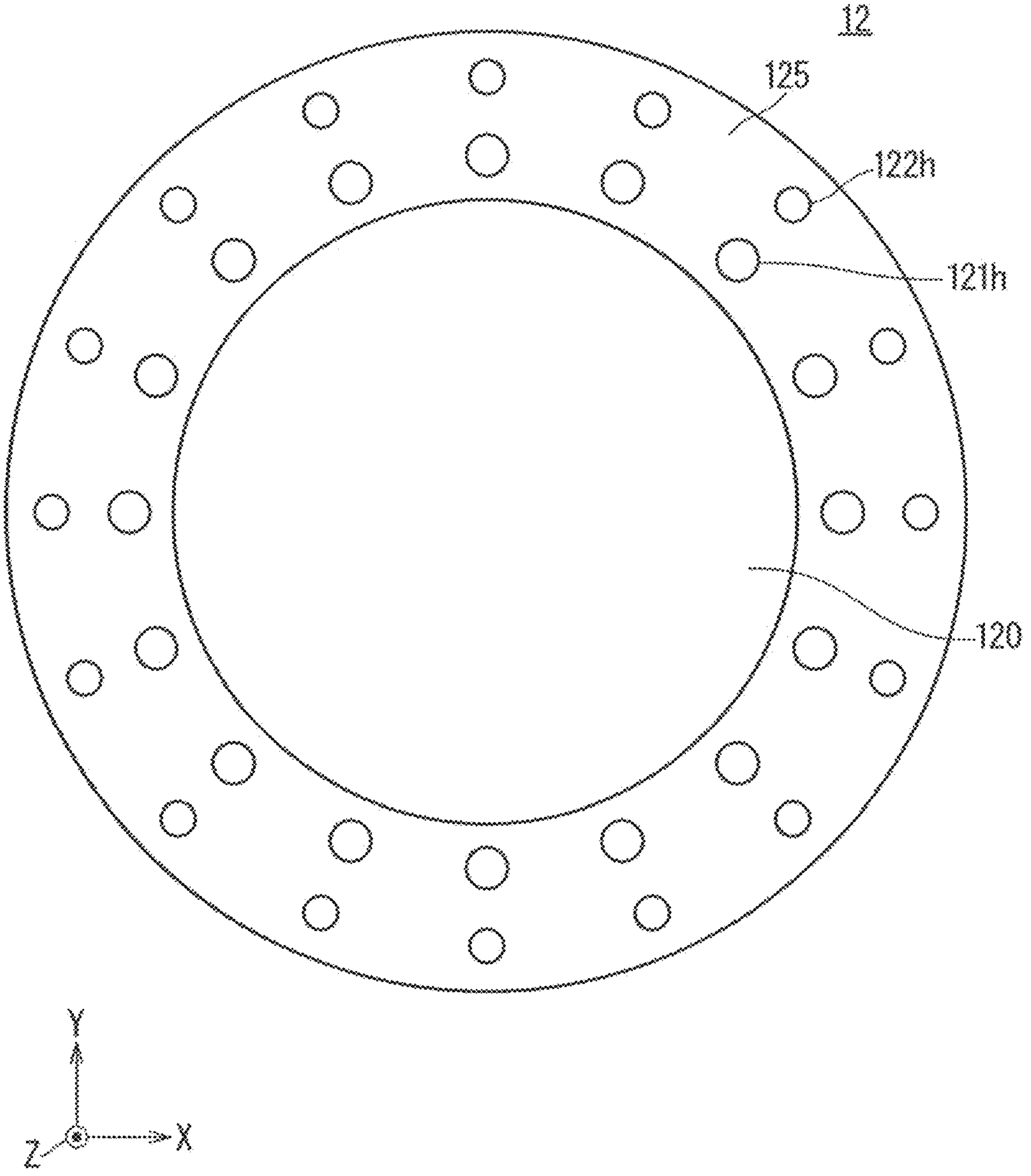
FIG. 29 is an explanation diagram schematically illustrating a planar structure of a press member.
Figure 30:
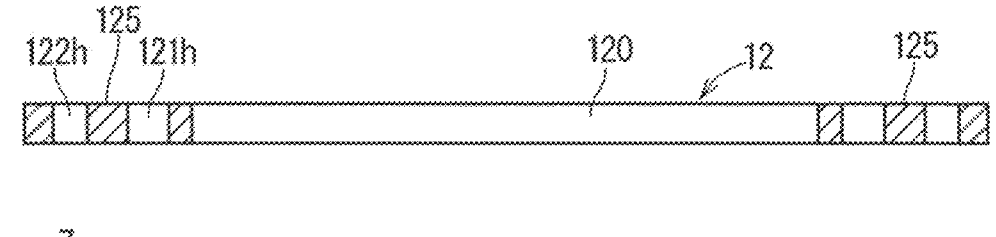
FIG. 30 is an explanation diagram schematically illustrating a cross-section structure of the press member.

FIG. 29 and FIG. 30 are explanation diagrams each schematically illustrating a structure of a press member 12. FIG. 29 illustrates a planar structure of the press member 12, and FIG. 30 illustrates a cross-section structure of the press member 12.

Each of FIG. 1 to FIG. 30 schematically illustrates constituent components such as the active gas generation apparatus 71, the electrode unit 50, or the electrode unit 50, and a shape including scale reduction does not necessarily coincide with each other in FIG. 1 to FIG. 30. An XYZ rectangular coordinate system is illustrated in each of FIG. 1 to FIG. 30.

The active gas generation apparatus 71 according to the embodiment 1 is described hereinafter appropriately with reference to FIG. 1 to FIG. 30 described above.

(Whole Structure)

As illustrated in FIG. 1, the active gas generation apparatus 71 includes the electrode units 51 to 53 as the plurality of electrode units and the chassis 1 housing the electrode units 51 to 53 in a chassis space S1 (refer to FIG. 8) and having conductivity.

As illustrated in FIG. 2 and FIG. 7, the chassis 1 includes a chassis bottom part 1*a* including a flat surface 1F and a conductor housing space 6S concaved from the flat surface 1F in a depth direction.

As illustrated in FIG. 8, the chassis 1 includes the chassis bottom part 1*a*, a chassis side part 1*b*, and a chassis upper part 1*c*, and the chassis space S1 housing the electrode units 51 to 53 therein is formed by the chassis bottom part 1*a*, the chassis side part 1*b*, and the chassis upper part 1*c*.

Each of the electrode units 51 to 53 is housed in the chassis space S1 in the chassis 1 in a state where the ground conductor 6 is disposed in the conductor housing space 6S. As illustrated in FIG. 7, the material gas G1 supplied from an outer portion is supplied to a material gas flow space provided in a lower surface and a side surface of the ground conductor 6 disposed in the conductor housing space 6S through the gas flow path 21 provided in the chassis bottom part 1*a*.

The electrode unit 51 (50) includes a high voltage side electrode constituting part E1 as a first electrode constituting part and the ground side electrode constituting part E2 as a second electrode constituting part provided on a lower side of the high voltage side electrode constituting part E1.

The electrode unit 51 further includes the ground conductor 6 as a reference potential conductor provided on a lower side of the ground side electrode constituting part E2 as the second electrode constituting part and housed in the conductor housing space 6S. The ground conductor 6 includes a conductor such as metal as a constituent material.

The high voltage side electrode constituting part E1 as the first electrode constituting part includes the high voltage side dielectric film 2 as the first electrode dielectric film and the power supply body 5 as the first electrode conductive film formed on the upper surface of the high voltage side dielectric film 2. The power supply body 5 as the first electrode conductive film is provided on a power supply body arrangement concave part 28 provided in a center of the high voltage side dielectric film 2 as the first electrode dielectric film.

The high voltage side dielectric film 2 includes a dielectric as a constituent material, and the power supply body 5 includes a conductor such as metal as a constituent material. For example, the power supply body 5 is made of metal.

The ground side electrode constituting part E2 includes the ground side dielectric film 3 as the second electrode dielectric film and the conductive film 7 as the second electrode conductive film formed on the lower surface of the ground side dielectric film 3. The conductive film 7 has a small film thickness, thus illustration thereof is omitted in FIG. 2 etc., and a formation region of the conductive film 7 is illustrated in FIG. 20 and FIG. 21.

The ground side dielectric film 3 includes a dielectric as a constituent material, and the conductive film 7 includes a conductor such as metal as a constituent material.

The ground conductor 6 as the reference potential conductor includes an active gas buffer space 68 which does not pass through in an upper portion, and the ground side electrode constituting part E2 is disposed to cover the active gas buffer space 68. Accordingly, a lower surface of the conductive film 7 and an upper surface of the ground conductor 6 have a contact relationship on an outer side of the active gas buffer space 68.

The ground side dielectric film 3 as the second electrode dielectric film includes a dielectric through port 3*h* passing through the ground side dielectric film 3 in a region overlapped with the active gas buffer space 68 in a plan view, the conductive film 7 as the second electrode conductive film includes a conductive film opening part 7*h* in a region overlapped with the active gas buffer space 68 in a plan view, and the conductive film opening part 7*h* is overlapped with the dielectric through port 3*h* in a plan view.

The chassis bottom part 1*a* of the chassis 1 includes the gas flow path 21 receiving the material gas G1 from an outer portion, and a material gas flow space is provided between the ground conductor 6 and the conductor housing space 6S in the chassis 1. As described hereinafter, the material gas flow space includes a material gas buffer space 61, a slit space 62, and a side surface space 63.

The material gas G1 is introduced into a main discharge space of the discharge space 4 through the gas flow path 21 and the material gas flow space described above. As described hereinafter, the main discharge space indicates the discharge space 4 in a dielectric space 18 between the high voltage side dielectric film 2 and the ground side dielectric film 3.

Alternating current voltage applied from an alternating current power source 15 is applied to the power supply body 5 as the first electrode conductive film via an electrical connection means such as an electrical wiring or an introduction terminal. Illustration of the electrical connection means is omitted in FIG. 2 etc.

In the meanwhile, the chassis 1 is set to have ground potential as reference potential. Accordingly, the conductive film 7 as the second electrode conductive film is set to have ground potential via the chassis 1 and the ground conductor 6.

The electrode unit 51 (50) further includes an auxiliary member such as the dielectric film support member 10, the dielectric film suppression member 11, and the press member 12.

(Fixation of High Voltage Side Dielectric Film 2)

A level difference part 102 of the dielectric film support member 10 includes an upper surface serving as a support surface 10F provided on the flat surface 1F of the chassis 1 to support the high voltage side dielectric film 2 from a lower side. At this time, the dielectric film support member 10 is disposed on the flat surface 1F so that a side surface of the dielectric film support member 10 and a side surface of the conductor housing space 6S on the chassis bottom part 1*a* of the chassis 1 coincide with each other.

The dielectric film suppression member 11 is a member for suppressing the high voltage side dielectric film 2 from an upper side, and is not overlapped with the power supply body 5 in a plan view. That is to say, an exposed region EX2 where the dielectric film suppression member 11 and the power supply body 5 are not formed is located on the upper surface of the high voltage side dielectric film 2.

As illustrated in FIG. 6, FIG. 27, and FIG. 28, a lower surface of the dielectric film suppression member 11 includes a dielectric contact region 112 having contact with the upper surface of the high voltage side dielectric film 2 and a dielectric non-contact region 111 which does not have contact with the upper surface of the high voltage side dielectric film 2. The dielectric contact region 112 serves as a region having contact with the high voltage side dielectric film 2 to apply a load, and the dielectric non-contact region 111 serves as a region protruding to a side of the power supply body 5 on the upper surface of the high voltage side dielectric film 2 without having a contact relationship with the high voltage side dielectric film 2.

The dielectric contact region 112 is overlapped with a surrounding region of the high voltage side dielectric film 2 and the support surface 10F of the dielectric film support member 10 in a plan view, and the dielectric non-contact region 111 is overlapped with an intermediate region on an inner side of the surrounding region of the high voltage side dielectric film 2 in a plan view. That is to say, the intermediate region is a region adjacent to a side of the power supply body 5 from the surrounding region of the high voltage side dielectric film 2.

The dielectric film suppression member 11 is made of metal etc., has conductivity, and is set to have ground potential as reference potential via the chassis 1, an attachment bolt 31, and the press member 12. The attachment bolt 31 and the press member 12 also have conductivity.

Accordingly, the high voltage side dielectric film 2 is suppressed by the dielectric film suppression member 11 from the upper side in the dielectric contact region 112. A combination structure of the dielectric film support member 10, the dielectric film suppression member 11, and the press member 12 is described in detail hereinafter.

As illustrated in FIG. 2, the press member 12 is disposed on the upper surface of the dielectric film support member 10, and the press member 12 and the dielectric film support member 10 are fixed on the chassis bottom part 1*a* of the chassis 1 by the attachment bolt 31.

As illustrated in FIG. 24 and FIG. 25, the dielectric film support member 10 has a circular shape having a center opening part 100 in a center thereof in a plan view. A level difference structure made up of a level difference part 102 and a surrounding part upper surface 101 is provided to have an annular shape around the center opening part 100. An upper surface of the level difference part 102 serves as the support surface 10F. A plurality of through ports 10*h* are dispersedly disposed to have a circular shape in the surrounding part upper surface 101 on a side of an outer periphery of the level difference part 102 (the support surface 10F).

In the meanwhile, as illustrated in FIG. 9 and FIG. 10, the high voltage side dielectric film 2 has a circular shape with the power supply body arrangement concave part 28 in a center thereof in a plan view. A surrounding surface region 27 is annularly provided around the power supply body arrangement concave part 28. The high voltage side dielectric film 2 includes a circular concave part bottom surface 26 in a plan view, and a bottom surface around the concave part bottom surface 26 serves as an annular convex part bottom surface 23.

As illustrated in FIG. 13 and FIG. 14, the power supply body 5 has a columnar shape. The power supply body 5 is disposed on the upper surface of the high voltage side dielectric film 2 while a bottom surface of the power supply body 5 is located on the power supply body arrangement concave part 28 of the high voltage side dielectric film 2.

Alternating current voltage is applied to the power supply body 5 as the first electrode conductive film from the alternating current power source 15. As illustrated in FIG. 5, the power supply body arrangement concave part 28 includes the power supply body 5 in a plan view, and has a planar shape slightly larger than the power supply body 5.

The high voltage side dielectric film 2 is disposed on the dielectric film support member 10 while the support surface 10F of the dielectric film support member 10 and the convex part bottom surface 23 of the high voltage side dielectric film 2 have contact with each other. The high voltage side dielectric film 2 and the dielectric film support member 10 have contact with each other via a seal member such as an O ring not shown in the diagrams.

As illustrated in FIG. 26 and FIG. 27, the dielectric film suppression member 11 has a circular shape having a center opening part 110 in a center thereof in a plan view. An annular lower surface region provided on a side of an outer periphery of the center opening part 110 serves as the dielectric non-contact region 111, and an annular lower surface region provided on a side of an outer periphery of the dielectric non-contact region 111 serves as the dielectric contact region 112.

As illustrated in FIG. 28, the dielectric contact region 112 protrudes to a lower side of the dielectric non-contact region 111 (−Z direction), and has a contact relationship with an upper surface U2 of the high voltage side dielectric film 2. In the meanwhile, a gap SP11 is located between the dielectric non-contact region 111 and the upper surface U2 of the high voltage side dielectric film 2, thus the dielectric non-contact region 111 does not have contact with the upper surface U2 of the high voltage side dielectric film 2.

As illustrated in FIG. 29 and FIG. 30, the press member 12 has a circular shape having a center opening part 120 in a center thereof in a plan view. A plurality of inner through ports 121*h* are dispersedly disposed to have a circular shape in an outer peripheral region 125 on a side of an outer periphery of the center opening part 120, and a plurality of outer through ports 122*h* are dispersedly disposed to have a circular shape on a side of an outer periphery of the plurality of inner through ports 121*h*.

In this manner, the plurality of inner through ports 121*h* and the plurality of outer through ports 122*h* are provided in the outer peripheral region 125 of the press member 12. Each of the plurality of inner through ports 121*h* is a through port made by cutting a tap.

A part of the outer peripheral region 125 in the press member 12 having the above structure is disposed on the dielectric film support member 10, and the dielectric film support member 10 and the press member 12 are fixed to the chassis bottom part 1*a* of the chassis 1 by the plurality of attachment bolts 31. A screw part of each of the plurality of attachment bolts 31 passes through the plurality of outer through ports 122*h* and the plurality of through ports 10*h*, and is attached to the chassis bottom part 1*a*.

As illustrated in FIG. 2 to FIG. 6, the press member 12 is disposed in a region overlapped with the dielectric film support member 10 and the dielectric film suppression member 11 in a plan view.

In the meanwhile, a plurality of suppression auxiliary members 32 are attached to the press member 12 while passing through the plurality of inner through ports 121*h* of the press member 12. A bolt or a locking screw is considered as the suppression auxiliary member 32. The plurality of suppression auxiliary members 32 attach the dielectric film suppression member 11 to an inner side of the plurality of inner through ports 121*h* while pressing the dielectric film suppression member 11. The plurality of suppression auxiliary members 32 are provided in a position overlapped with the dielectric contact region 112 of the dielectric film suppression member 11 and the convex part bottom surface 23 of the high voltage side dielectric film 2 in a plan view.

Accordingly, the high voltage side dielectric film 2 is suppressed from the dielectric contact region 112 on an upper side by the dielectric film suppression member 11 receiving suppress strength of the plurality of suppression auxiliary members 32.

As described above, in the electrode unit 50 of the active gas generation apparatus 71 according to the embodiment 1, the high voltage side dielectric film 2 as the first electrode dielectric film is suppressed from the dielectric contact region 112 on the upper side by the dielectric film suppression member 11 receiving suppress strength of the plurality of suppression auxiliary members 32. Thus, a region in which a load is applied to the high voltage side dielectric film 2 by the dielectric film suppression member 11 can be limited to a lower region of the dielectric contact region 112.

As a result, the active gas generation apparatus 71 according to the embodiment 1 can stably fix the high voltage side dielectric film 2 between the dielectric contact region 112 of the dielectric film suppression member 11 and the support surface 10F of the dielectric film support member 10 without unnecessary bending stress applied to the high voltage side dielectric film 2.

The dielectric film suppression member 11 is set to have ground potential as reference potential, and has conductivity. The dielectric non-contact region 111 of the dielectric film suppression member 11 is overlapped with the intermediate region of the high voltage side dielectric film 2 in a plan view.

Accordingly, the electrode unit 50 can reduce electrical field strength of the power supply body 5 by the dielectric film suppression member 11 including the dielectric non-contact region 111 to reduce potential of the intermediate region of the high voltage side dielectric film 2, thus potential of the high voltage side dielectric film 2 and the ground side dielectric film 3 in an outer diameter direction can be reduced.

As a result, the electrode unit 50 in the active gas generation apparatus 71 according to the embodiment 1 can reliably prevent insulation breakdown in a gap 20 between the high voltage side dielectric film 2 and the dielectric film support member 10.

(Ground Conductor 6)

As illustrated in FIG. 15 to FIG. 17, the ground conductor 6 housed in the conductor housing space 6S in the chassis 1 has a circular shape in a plan view, and includes the material gas buffer space 61 and the slit space 62 in an end portion region in the bottom surface.

The material gas buffer space 61 is formed into an annular shape in a plan view, and is connected to the gas flow path 21 as illustrated in FIG. 2, thus can take the material gas G1 supplied from an outer portion in the material gas buffer space 61 through the gas flow path 21.

The plurality of slit spaces 62 are dispersedly provided around the material gas buffer space 61. As illustrated in FIG. 17, each of the plurality of slit spaces 62 is connected to the material gas buffer space 61, and the material gas G1 can flow from the material gas buffer space 61 to the slit space 62.

As illustrated in FIG. 6 and FIG. 17, the side surface space 63 is a gap space between an inner peripheral side surface of the conductor housing space 6S and an outer peripheral side surface of the ground conductor 6, and is annularly provided in a plan view.

The dielectric film support member 10 and the ground conductor 6 have a positional relationship as illustrated in FIG. 3 and FIG. 4, thus the material gas G1 passing through the side surface space 63 is supplied to a lower side surface region R10 in the dielectric film support member 10.

In this manner, the material gas buffer space 61 is provided on the side of the lower surface of the ground conductor 6 to receive the material gas G1 through the gas flow path 21. Each of the plurality of slit spaces 62 is provided on the side of the lower surface of the ground conductor 6, and is connected to the material gas buffer space 61.

The side surface space 63 is provided on a side of the side surface of the ground conductor 6, and is connected to the plurality of slit spaces. As described above, the material gas flow space includes the material gas buffer space 61, the plurality of slit spaces 62, and the side surface space 63.

Accordingly, the material gas G1 supplied to the gas flow path 21 from the outer portion is introduced into the discharge space 4 through the material gas buffer space 61, the slit space 62, and the side surface space 63.

Each of the plurality of slit spaces 62 is set to be a narrow space in which material gas hardly flow compared with the material gas buffer space 61 so that the material gas G1 temporarily remains in the material gas buffer space 61, and then flows into each of the plurality of slit spaces 62. That is to say, the plurality of slit spaces 62 are set to have small conductance as a coefficient expressing a degree of flowability of the material gas G1 compared with the material gas buffer space 61 and the side surface space 63.

As a result, the active gas generation apparatus 71 according to the embodiment 1 can uniformly supply the material gas G1 spatially to the discharge space 4. That is to say, the material gas G1 is uniformly supplied from a surrounding part of the circular dielectric space 18 toward the discharge space 4 in the center in a plan view.

The conductance of the slit space 62 is set to be small, thus differential pressure between the material gas buffer space 61 and the side surface space 63 increases, and fluctuation of a flow amount of the material gas G1 flowing in each of the plurality of slit spaces 62 is reduced. Accordingly, the material gas G1 is uniformly supplied toward the discharge space 4. A flow amount of the material gas G1 is adjusted by a mass flow controller (MFC) provided on an upstream of the gas flow path 21, for example.

Accordingly, when the material gas G1 is not uniformly supplied in a general active gas generation apparatus, a time of the material gas G1 passing through the discharge space 4 is changed, and as a result, a failure of deterioration of generation efficiency of the active gas G2 occurs. The active gas generation apparatus 71 according to the embodiment 1 can uniformly supply the material gas G1, thus the failure described above does not occur.

(Ground Side Electrode Constituting Part E2 and Active Gas Buffer Space 68)

As described above, the ground side electrode constituting part E2 as the second electrode constituting part includes the ground side dielectric film 3 and the conductive film 7.

As illustrated in FIG. 11 and FIG. 12, the ground side dielectric film 3 has a circular shape in a plan view, and includes the circular dielectric through port 3*h* in the center thereof.

As illustrated in FIG. 18 and FIG. 19, the cover dielectric film 8 has a circular shape in a plan view, and includes a circular cover through port 8*h* in the center thereof. It is preferable that the same constituent material is used for the cover dielectric film 8 and the ground side dielectric film 3. The reason is that occurrence of distortion is prevented in a case where a thermal expansion coefficient is different between the cover dielectric film 8 and the ground side dielectric film 3. It is also applicable to select a material having a close thermal expansion coefficient as a material of each of the cover dielectric film 8 and the ground side dielectric film 3.

As illustrated in FIG. 20 and FIG. 21, the conductive film 7 has a circular shape in a plan view, and includes the circular conductive film opening part 7*h* in the center thereof in a plan view.

Each of the dielectric through port 3*h* and the conductive film opening part 7*h* is overlapped with an active gas buffer space 68 in a plan view, and as illustrated in FIG. 21, the conductive film opening part 7*h* includes the dielectric through port 3*h* and has a shape larger than the dielectric through port 3*h* in a plan view.

The conductive film 7 is provided on the lower surface of the ground side dielectric film 3 while a center position of each of the ground side dielectric film 3 and the conductive film 7 coincides with each other. A diameter of the conductive film 7 is set to be substantially the same as that of the ground side dielectric film 3, however, a formation area of the conductive film 7 is smaller than that of the ground side dielectric film 3 by reason that the conductive film opening part 7*h* larger than the dielectric through port 3*h* is provided in the center thereof.

A conductive film inner boundary 7*e* as a circumferential outer peripheral line of the conductive film opening part 7*h* serves as an end portion of the conductive film 7 on a side of the dielectric through port 3*h*, and the conductive film 7 is not formed in a region on an inner side of the conductive film inner boundary 7*e*. The conductive film inner boundary 7*e* serves as an electrode boundary line of the conductive film 7. Accordingly, as illustrated in FIG. 21, a formation region A7 of the conductive film 7 on the lower surface of the ground side dielectric film 3 is a region ranging from a position of an outer periphery of the ground side dielectric film 3 to the conductive film inner boundary 7*e*.

As illustrated in FIG. 20 and FIG. 21, the cover dielectric film 8 is provided to have a circular shape from the lower surface of the ground side dielectric film 3 to the lower surface of the conductive film 7 while including the conductive film inner boundary 7*e*. However, the cover dielectric film 8 includes the cover through port 8*h* in a center thereof. That is to say, there is a dimensional relationship that an outer diameter of the conductive film opening part 7*h* of the conductive film 7 is smaller than that of the cover dielectric film 8.

The cover through port 8*h* has substantially the same shape as the dielectric through port 3*h*, and is included in the conductive film opening part 7*h*, thus has a shape smaller than the conductive film opening part 7*h*. Accordingly, the cover dielectric film 8 covers the conductive film inner boundary 7*e* (electrode boundary line) of the conductive film 7. The lower surface of the conductive film 7 which is not covered by the cover dielectric film 8 and the upper surface of the ground conductor 6 have a contact relationship with each other.

As illustrated in FIG. 15 and FIG. 16, the active gas buffer space 68 provided in the upper portion of the ground conductor 6 has a circular shape in a plan view, and a plurality of gas ejection ports 69 are provided around a bottom surface 65 of the active gas buffer space 68.

FIG. 15 and FIG. 16 also illustrate a formation region of the cover dielectric film 8. As illustrated in FIG. 15 and FIG. 16, an outer peripheral line of the cover dielectric film 8 is substantially the same as that of the active gas buffer space 68.

As illustrated in FIG. 2 and FIG. 16, the shield dielectric film 9 is provided on the bottom surface 65 of the active gas buffer space 68.

As illustrated in FIG. 22 and FIG. 23, the shield dielectric film 9 is formed into a circular shape with a predetermined film thickness in a plan view.

The shield dielectric film 9 is provided on the bottom surface 65 of the active gas buffer space 68 while a center position of each of the active gas buffer space 68 and the shield dielectric film 9 coincides with each other.

As illustrated in FIG. 15 and FIG. 16, the plurality of gas ejection ports 69 are overlapped with the cover dielectric film 8 in a plan view, and are not overlapped with the dielectric through port 3*h* and the cover through port 8*h* in a plan view.

As illustrated in FIG. 16, the plurality of gas ejection ports 69 are provided around the bottom surface 65 of the active gas buffer space 68 to pass through the ground conductor 6. That is to say, the plurality of gas ejection ports 69 are provided in a surrounding region of the shield dielectric film 9 in a plan view.

In the active gas generation apparatus 71 according to the embodiment 1 having such a structure, the material gas G1 is supplied from the outer portion of the chassis 1 to the discharge space 4 through the gas flow path 21 and the material gas flow space as described above.

When the material gas G1 is supplied to the discharge space 4 where the dielectric barrier discharge occurs, the material gas G1 is activated to be the active gas G2, and passes through the dielectric through port 3*h* and the cover through port 8*h* to be introduced into the active gas buffer space 68. The active gas G2 entering the active gas buffer space 68 passes through the plurality of gas ejection ports 69 provided in the bottom surface of the active gas buffer space 68 to be supplied to a processing space in a subsequent stage.

In the active gas generation apparatus 71 according to the embodiment 1 having such a configuration, a main dielectric space where the high voltage side dielectric film 2 as the first electrode dielectric film and the ground side dielectric film 3 as the second electrode dielectric film face each other serves as the dielectric space 18. The dielectric space 18 has a circular shape in a plan view. A space where the high voltage side dielectric film 2 and the shield dielectric film 9 face each other is regulated as an auxiliary dielectric space. The discharge space 4 includes a main discharge space where the power supply body 5 and the conductive film 7 are overlapped with each other in a plan view in the dielectric space 18.

In order to form the main discharge space described above, the high voltage side dielectric film 2 and the ground side dielectric film 3 are disposed to correspond to each other so as to have a constant distance therebetween in a height direction (Z direction), and the main discharge space described above of the discharge space 4 is located in the dielectric space 18 between the high voltage side dielectric film 2 and the ground side dielectric film 3.

The discharge space 4 further includes an auxiliary discharge space 44 made up of the dielectric through port 3*h*, the cover through port 8*h*, and a part of the active gas buffer space 68 on the shield dielectric film 9 in the auxiliary dielectric space described above.

A bottom surface region below the bottom surface 65 of the ground conductor 6 is used as a ground electrode conductive film set to have ground potential, and discharge voltage is applied between the power supply body 5 receiving alternating current voltage from the alternating current power source 15 and the ground electrode conductive film described above, thus the auxiliary discharge space 44 can be generated.

As described above, the auxiliary discharge space 44 includes the dielectric through port 3*h*, the cover through port 8*h*, and a part of the active gas buffer space 68. In this manner, the discharge space 4 formed in the embodiment 1 includes the main discharge space and the auxiliary discharge space 44 in the dielectric space 18.

In the active gas generation apparatus 71 according to the embodiment 1, a path from the auxiliary discharge space 44 to each of the plurality of gas ejection ports 69 is regulated as the active gas flow path.

In the active gas generation apparatus 71 according to the embodiment 1, the auxiliary discharge space 44 as a part of the discharge space 4 includes the dielectric through port 3*h*, the cover through port 8*h*, and a part of the active gas buffer space 68, thus can suppress the active gas flow path from the auxiliary discharge space 44 to the plurality of gas ejection ports 69 to have a minimum necessary volume to suppress a deactivation amount of the active gas G2.

Furthermore, the cover dielectric film 8 in the ground side electrode constituting part E2 of the electrode unit 50 covers the conductive film inner boundary 7*e* as the electrode boundary line of the conductive film 7 in the active gas buffer space 68, and is overlapped with the plurality of gas ejection ports 69 in a plan view, thus can suppress a surface deactivation phenomenon in which the active gas G2 gets dissipated due to collision of the active gas G2 with the conductive film 7.

As a result, the active gas generation apparatus 71 according to the embodiment 1 can supply the high concentration active gas G2 from the plurality of gas ejection ports 69 to the processing space in the subsequent stage.

The electrode unit 50 according to the embodiment 1 has the structure described above, thus only the components (the high voltage side dielectric film 2, the ground side dielectric film 3, the cover dielectric film 8, and the shield dielectric film 9) made up of the dielectric serving as the insulator as the constituent material face the discharge space 4. When a metal material faces discharge, it is easily ionized, and metal ions are included in gas, thus causes contamination. In the meanwhile, even when the dielectric faces discharge, it is not easily ionized, thus can prevent contamination in the gas.

(Chassis Opening Part 41)

As illustrated in FIG. 2, the chassis bottom part 1*a* of the chassis 1 includes a chassis opening part 41. The chassis opening part 41 is provided in a region overlapped with the active gas buffer space 68 in a plan view, and passes through the chassis bottom part 1*a*.

Accordingly, the active gas G2 ejected from the plurality of gas ejection ports 69 is introduced into the processing space on the lower side through the chassis opening part 41.

As illustrated in FIG. 2, the chassis opening part 41 provided to the chassis bottom part 1*a* has a larger opening area with decreasing distance to the lower side, and has a tapered shape with a lowermost outer peripheral edge 41L as illustrated in FIG. 2 and FIG. 7.

In the active gas generation apparatus 71 according to the embodiment 1, the chassis opening part 41 provided to the chassis bottom part 1*a* of the chassis 1 has the tapered shape with the larger opening area with decreasing distance to the lower side.

Accordingly, the active gas generation apparatus 71 according to the embodiment 1 can suppress loss of the active gas G2 ejected from the plurality of gas ejection ports 69 due to collision of the active gas G2 with the chassis bottom part 1*a* to a minimum, thus can supply the high concentration active gas G2 to the processing space on the lower side.

Embodiment 2

Problem in Embodiment 1

In the active gas generation apparatus 71 according to the embodiment 1 described above, the active gas G2 is supplied from the active gas buffer space 68 to the processing space in the subsequent stage located on the lower side through the plurality of gas ejection ports 69. In the description hereinafter, the active gas G2 ejected from the plurality of gas ejection ports 69 is defined as the plural pieces of partial active gas.

Figure 31:
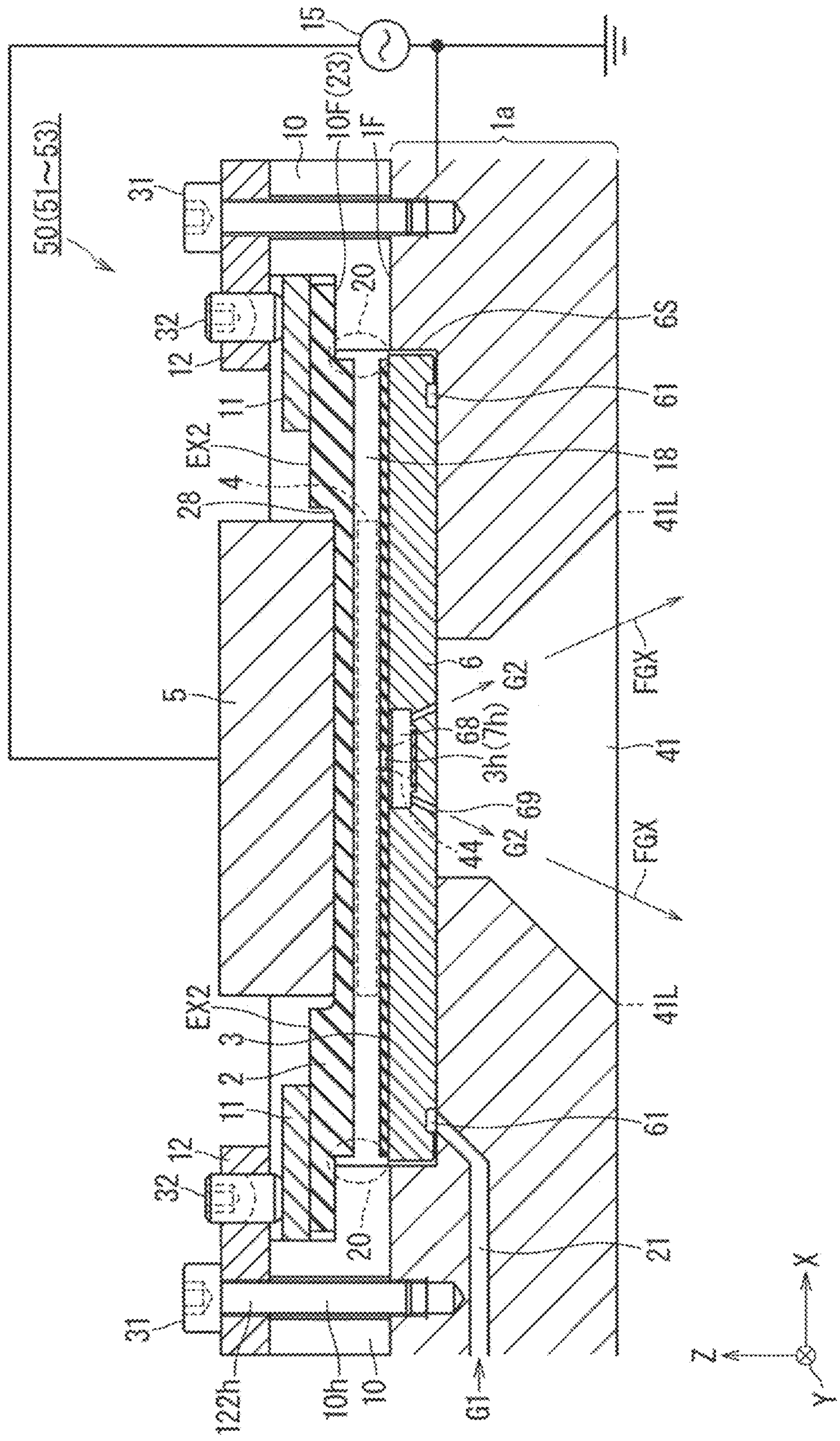
FIG. 31 is an explanation diagram schematically illustrating an ejection form of active gas in an electrode unit in the active gas generation apparatus according to the embodiment 1.
Figure 32:
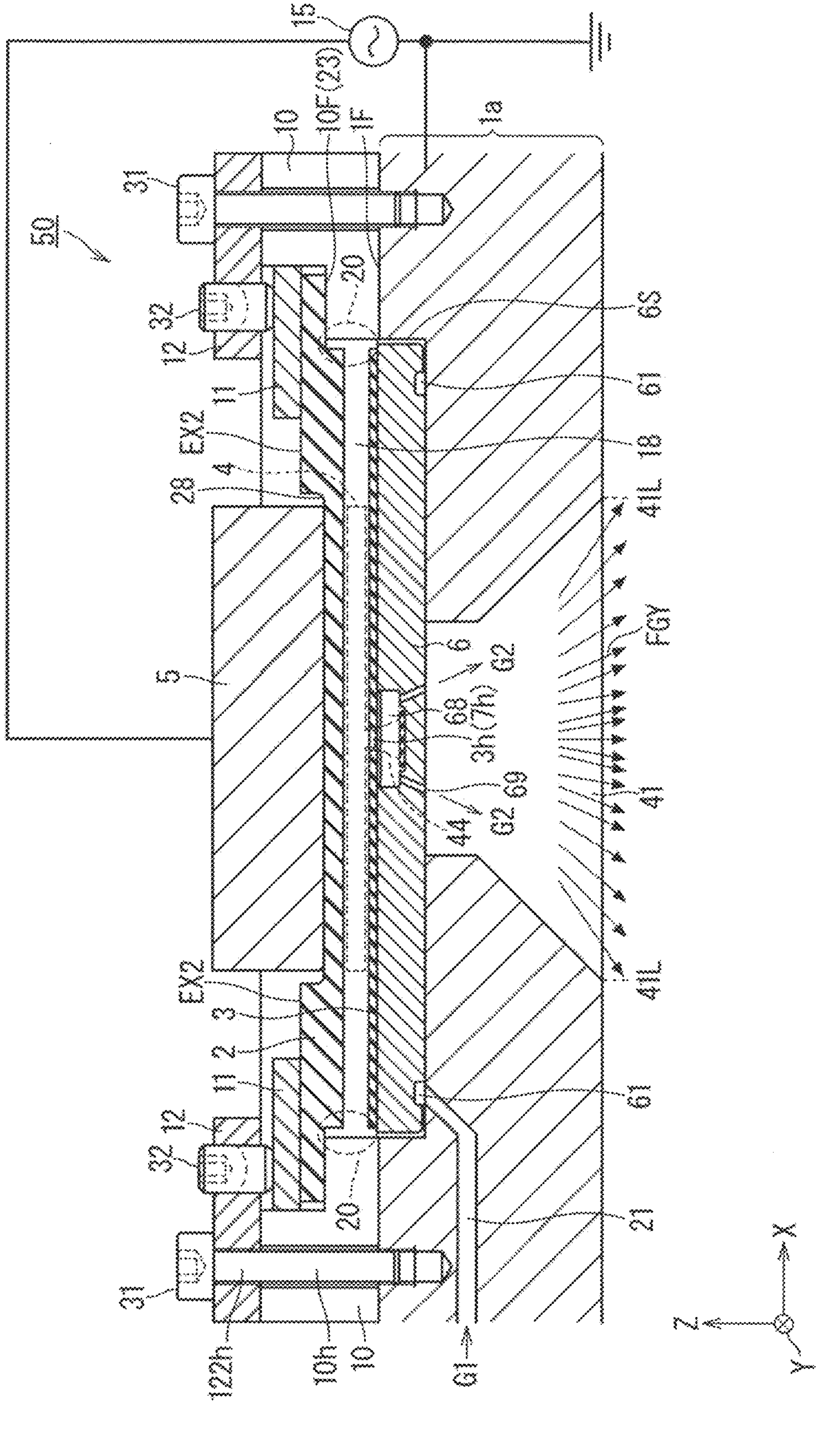
FIG. 32 is an explanation diagram schematically illustrating an ideal ejection form of the active gas in the electrode unit according to the embodiment 1.

FIG. 31 is an explanation diagram schematically illustrating an ejection form of active gas G2 in the electrode unit 50 (51 to 53) in the active gas generation apparatus 71 according to the embodiment 1. FIG. 32 is an explanation diagram schematically illustrating an ideal ejection form of the active gas G2 in the electrode unit 50. FIG. 31 and FIG. 32 correspond to an A-A cross section in FIG. 1, for example. An XYZ rectangular coordinate system is illustrated in each of FIG. 31 and FIG. 32.

As illustrated in FIG. 31, in the electrode unit 50 (51 to 53) included in the active gas generation apparatus 71 according to the embodiment 1, the plurality of gas ejection ports 69 are provided to be away from each other with decreasing distance to the lower side so that collision does not occur between the plural pieces of partial active gas.

However, when spatial pressure p0 of the active gas buffer space 68 and spatial pressure of the processing space in the subsequent stage are significantly different from each other such as a case of $\{(p1/p0)<0.5\}$, for example, the plural pieces of partial active gas ejected from the plurality of gas ejection ports 69 have a flow of only one direction referred to as a choked flow as illustrated by a gas flow FGX in FIG. 31, and each of the plural pieces of partial active gas is not diffused but proceeds in straight line.

Adopted in the active gas generation apparatus 71 according to the embodiment 1 is a structure of providing the plurality of gas ejection ports 69 for each electrode unit 50 to uniformly supply the active gas G2 to the processing space in the subsequent stage and further providing the plurality of electrode units 50 as the electrode units 51 to 53 to supply the active gas G2 to the processing space having a relatively wide region.

However, each of the plural pieces of partial active gas ejected from each electrode unit 50 is supplied to the processing space with a gas flow FGX in straight line illustrated in FIG. 31 which is not a gas flow FGY diffused to multiple directions illustrated in FIG. 32.

In this manner, the partial active gas ejected from each of the plurality of gas ejection ports 69 of the electrode unit 50 basically has only one directionality. Thus, the active gas generation apparatus 71 according to the embodiment 1 still has a problem that the active gas G2 cannot be uniformly supplied to the processing space in the manner similar to the first and second improvement structures described in "PROBLEM TO BE SOLVED BY THE INVENTION".

An active gas generation apparatus 75 according to the present embodiment 2 described hereinafter solves the problem described above.

Structure of Embodiment 2

Figure 33:
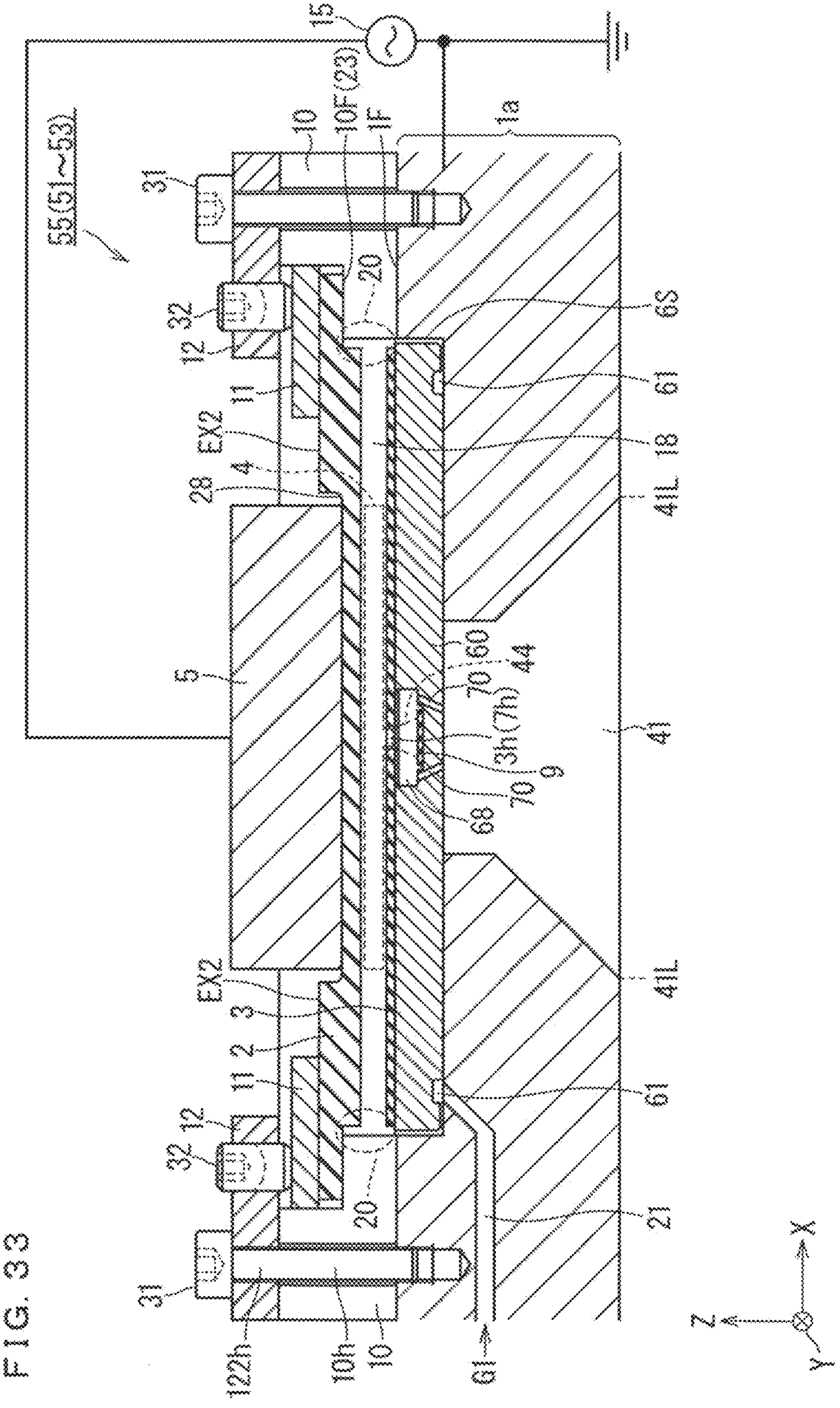
FIG. 33 is an explanation diagram illustrating a cross-section structure of an electrode unit in an active gas generation apparatus according to an embodiment 2.

FIG. 33 is an explanation diagram illustrating a cross-section structure of an electrode unit 55 used in the active gas generation apparatus 75 according to the embodiment 2.

A whole configuration of the active gas generation apparatus 75 is similar to that of the active gas generation apparatus 71 illustrated in FIG. 1. Accordingly, the electrode unit 55 illustrated in FIG. 33 corresponds to any of the whole configuration of the electrode units 51 to 53 in the active gas generation apparatus 75 illustrated in FIG. 1.

That is to say, the active gas generation apparatus 75 according to the embodiment 2 includes the electrode units 51 to 53 as the plurality of electrode units and the chassis 1 housing the electrode units 51 to 53 in the chassis space S1 (refer to FIG. 8) and having conductivity in the manner similar to the active gas generation apparatus 71 according to the embodiment 1.

The electrode unit 55 according to the embodiment 2 has characteristics that the ground conductor 6 of the electrode unit 50 according to the embodiment 1 is replaced with a ground conductor 60.

The same sign is assigned to the same constituent parts as those in the electrode unit 50 according to the embodiment 1, and characterizing portions of the electrode unit 55 according to the embodiment 2 is mainly described hereinafter.

As illustrated in FIG. 33, the electrode unit 55 includes the ground conductor 60 as a reference potential conductor, which is provided on the lower side of the ground side electrode constituting part E2 including the ground side dielectric film 3 and is housed in the conductor housing space 6S. The ground conductor 60 includes a conductor such as metal as a constituent material.

The electrode unit 55 according to the embodiment 2 is housed in the chassis space S1 in the chassis 1 while the ground conductor 60 is disposed in the conductor housing space 6S. The material gas G1 supplied from an outer portion is supplied to a material gas flow space provided in a lower surface and a side surface of the ground conductor 60 disposed in the conductor housing space 6S through the gas flow path 21 provided in the chassis bottom part 6*a*.

(Ground Conductor 60)

Figure 34:
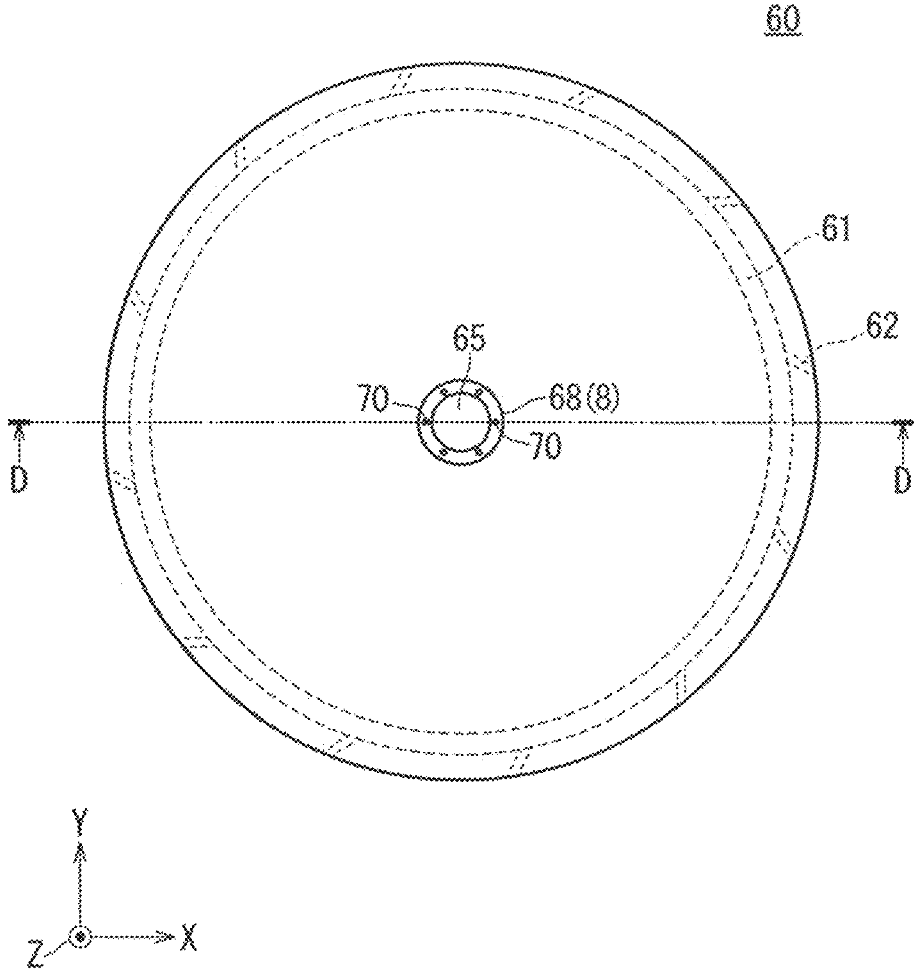
FIG. 34 is an explanation diagram (No. 2) schematically illustrating a structure of a ground conductor according to the embodiment 2.
Figure 35:
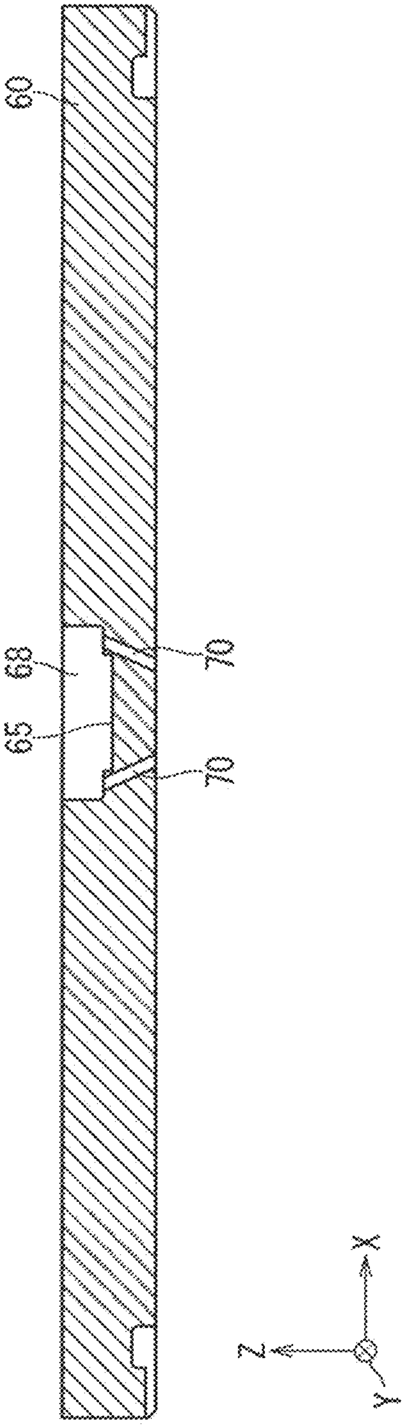
FIG. 35 is an explanation diagram (No. 2) schematically illustrating a structure of the ground conductor according to the embodiment 2.

FIG. 34 and FIG. 35 are explanation diagrams each schematically illustrating a structure of the ground conductor 60. FIG. 34 illustrates a planar structure of the ground conductor 60, and FIG. 35 illustrates a cross-section structure of the ground conductor 60. An XYZ rectangular coordinate system is illustrated in each of FIG. 34 and FIG. 35.

The ground conductor 60 as the reference potential conductor includes the active gas buffer space 68 which does not pass through in an upper portion, and the ground side electrode constituting part E2 including the ground side dielectric film 3 is disposed to cover the active gas buffer space 68. Accordingly, the lower surface of the conductive film 7 and an upper surface of the ground conductor 60 have a contact relationship on an outer side of the active gas buffer space 68.

The chassis 1 is set to have ground potential as reference potential in the manner similar to the embodiment 1. Accordingly, the conductive film 7 is set to have ground potential via the chassis 1 and the ground conductor 60.

The ground conductor 60 housed in the conductor housing space 6S in the chassis 1 has a circular shape in a plan view, and includes the material gas buffer space 61 and the slit space 62 in an end portion region in the bottom surface.

The material gas flow space including the material gas buffer space 61, the plurality of slit spaces 62, and the side surface space 63 is provided to the ground conductor 60 in the manner similar to the ground conductor 6 according to the embodiment 1.

Accordingly, the material gas G1 supplied to the gas flow path 21 from the outer portion is introduced into the discharge space 4 through the material gas buffer space 61, the slit space 62, and the side surface space 63.

Thus, the active gas generation apparatus 75 according to the embodiment 2 can uniformly supply the material gas G1 spatially to the discharge space 4 in the manner similar to the active gas generation apparatus 71 according to the embodiment 1.

As illustrated in FIG. 3 and FIG. 35, the active gas buffer space 68 provided in the upper portion of the ground conductor 60 has a circular shape in a plan view, and a plurality of gas ejection ports 70 are provided around a bottom surface 65 of the active gas buffer space 68.

The plurality of gas ejection ports 70 are overlapped with the cover dielectric film 8 in a plan view, and are not overlapped with the dielectric through port 3*h* and the cover through port 8*h* in a plan view in the manner similar to the plurality of gas ejection ports 69 according to the embodiment 1.

As illustrated in FIGS. 33 to 35, the plurality of gas ejection ports 70 are provided around the bottom surface 65 of the active gas buffer space 68 to pass through the ground conductor 60. That is to say, the plurality of gas ejection ports 70 are provided in a surrounding region of the shield dielectric film 9 in a plan view.

When the material gas G1 is supplied to the discharge space 4 where the dielectric barrier discharge occurs, the material gas G1 is activated to be the active gas G2, and passes through the dielectric through port 3*h* and the cover through port 8*h* to be introduced into the active gas buffer space 68. The active gas G2 entering the active gas buffer space 68 passes through the plurality of gas ejection ports 70 provided in the bottom surface of the active gas buffer space 68 to be supplied to a processing space in a subsequent stage.

In the active gas generation apparatus 75 according to the embodiment 2, a path from the auxiliary discharge space 44 to each of the plurality of gas ejection ports 70 is regulated as the active gas flow path.

In the active gas generation apparatus 75 according to the embodiment 2, the auxiliary discharge space 44 as a part of the discharge space 4 includes the dielectric through port 3*h*, the cover through port 8*h*, and a part of the active gas buffer space 68, thus can suppress the active gas flow path from the auxiliary discharge space 44 to the plurality of gas ejection ports 70 to have a minimum necessary volume to suppress a deactivation amount of the active gas G2.

Furthermore, the cover dielectric film 8 in the ground side electrode constituting part E2 of the electrode unit 55 covers the conductive film inner boundary 7*e* as the electrode boundary line of the conductive film 7 in the active gas buffer space 68, and is overlapped with the plurality of gas ejection ports 70 in a plan view, thus can suppress a surface deactivation phenomenon in which the active gas G2 gets dissipated due to collision of the active gas G2 with the conductive film 7.

As a result, the active gas generation apparatus 75 according to the embodiment 2 can supply the high concentration active gas G2 from the plurality of gas ejection ports 70 to the processing space in the subsequent stage in the manner similar to the embodiment 1.

The chassis bottom part 1*a* of the chassis 1 includes the chassis opening part 41 in the region overlapped with the active gas buffer space 68 in a plan view, and the active gas G2 ejected from the plurality of gas ejection ports 70 is introduced into the processing space on the lower side through the chassis opening part 41.

In the active gas generation apparatus 75 according to the embodiment 2, the chassis opening part 41 provided to the chassis bottom part 1*a* of the chassis 1 has the tapered shape with the larger opening area with decreasing distance to the lower side.

Accordingly, the active gas generation apparatus 75 according to the embodiment 2 can suppress loss of the active gas G2 ejected from the plurality of gas ejection ports 70 due to collision of the active gas G2 with the chassis bottom part 1*a*, and can supply the relatively high concentration active gas G2 to the processing space on the lower side in the manner similar to the embodiment 1.

(Plurality of Gas Ejection Ports 70)

The active gas G2 ejected from the plurality of gas ejection ports 70 provided to the electrode unit 55 according to the embodiment 2 is supplied to the processing space in the subsequent stage located on the lower side. Herein, the active gas ejected from the plurality of gas ejection ports 70 is defined as the plural pieces of partial active gas.

In the electrode unit 55 according to the embodiment 2, the plural pieces of partial active gas ejected from the plurality of gas ejection ports 70 is introduced to the lower side through the chassis opening part 41.

Figure 36:
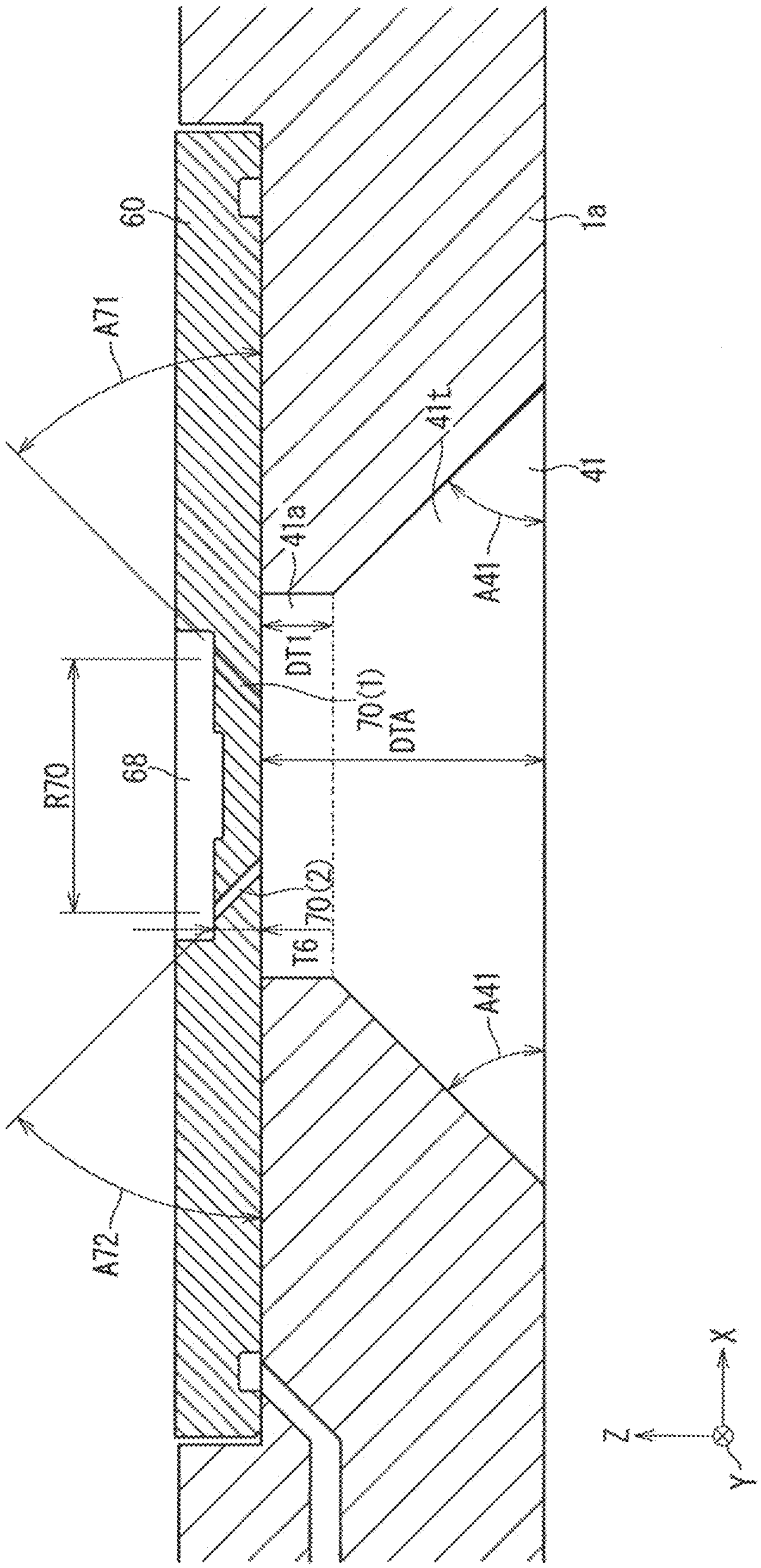
FIG. 36 is an explanation diagram (No. 1) schematically illustrating a cross-section structure of a plurality of gas ejection ports according to the embodiment 2.
Figure 37:
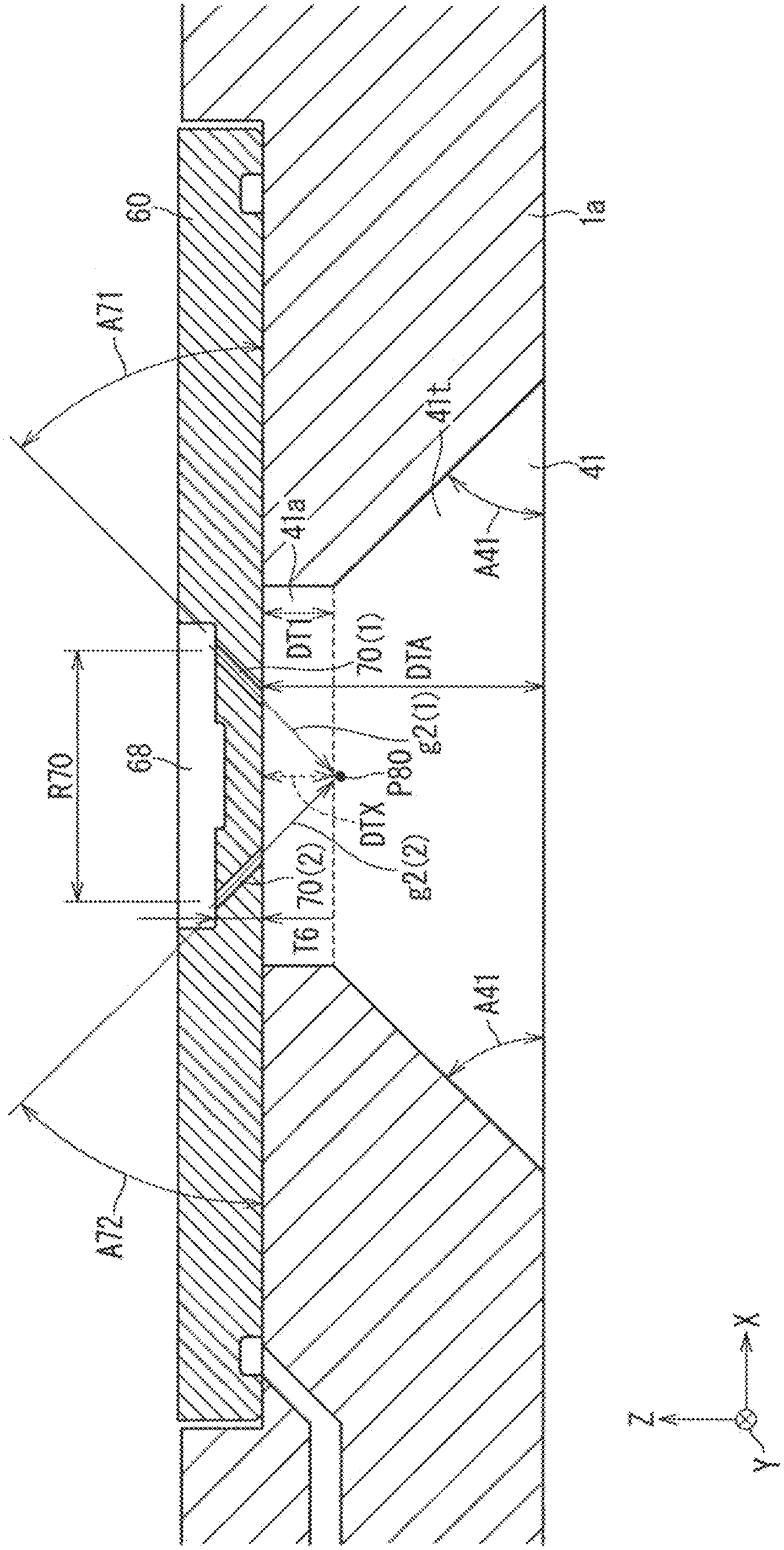
FIG. 37 is an explanation diagram (No. 2) schematically illustrating a cross-section structure of the plurality of gas ejection ports according to the embodiment 2.

FIG. 36 and FIG. 37 are explanation diagrams each schematically illustrating a cross-section structure of a plurality of gas ejection ports 70, and correspond to a D-D cross-section structure in FIG. 34. An XYZ rectangular coordinate system is illustrated in each of FIG. 36 and FIG. 37.

As illustrated in FIG. 36 and FIG. 37, the chassis opening part 41 includes an upper side region 41*a* having a constant opening area in a height direction (Z direction) and a lower side tapered region 41*t* as a tapered region having a tapered shape with a larger opening area with decreasing distance to the lower side. In the chassis opening part 41, the lower side tapered region 41*t* is a tapered region provided on a lower side of the upper side region 41*a*.

FIG. 37 illustrates a coordinate position located on a slightly lower side of a center position of a boundary line between the upper side region 41*a* and the lower side tapered region 41*t* as a collision point P80. The collision point P80 is located in a collision region 80 described hereinafter, and is a center of the collision region 80.

In the electrode unit 55 according to the embodiment 1, the plurality of gas ejection ports 70 are provided to get closer to each other with decreasing distance to the lower side so that the plural pieces of partial active gas collide with each other in the collision point P80.

A structure of the plurality of gas ejection ports 70 is described in detail hereinafter. FIG. 36 and FIG. 37 illustrate two gas ejection ports 70, however, the number of the plurality of gas ejection ports 70 is "three" or more as illustrated in FIG. 34.

In the description hereinafter, the gas ejection port 70 on a right side (+X direction side) in FIG. 36 and FIG. 37 in two gas ejection ports 70 illustrated in each of FIG. 36 and FIG. 37 is referred to as the gas ejection port 70(1), and the gas ejection port 70 on a left side (−X direction side) therein is referred to as the gas ejection port 70(2).

As described above, the plurality of gas ejection ports 70 are circularly disposed to be away from each other in a plan view. A circular virtual line connecting centers of the plurality of gas ejection ports 70 is referred to as "a virtual gas ejection port circle" hereinafter.

The gas ejection ports 70(1) and 70(2) correspond to a pair of gas ejection ports 70 and 70 facing each other in a diameter direction in the virtual gas ejection port circle described above. Herein, the partial active gas ejected from the gas ejection port 70(1) is referred to as partial active gas g2(1) and the partial active gas ejected from the gas ejection port 70(2) is partial active gas g2(2).

The gas ejection port 70(1) has a constant ejection port inclination A71 larger than "0" and smaller than 90 degrees with respect to a horizontal direction (X direction) as a reference direction. The ejection port inclination A71 is set to a direction in which the partial active gas s2(1) ejected from the gas ejection port 70(1) is directed to the collision point P80.

The gas ejection port 70(2) has a constant ejection port inclination A72 larger than "0" and smaller than 90 degrees with respect to the horizontal direction in the manner similar to the gas ejection port 70(1). The ejection port inclination A72 is set to a direction in which the partial active gas s2(2) ejected from the gas ejection port 70(2) is directed to the collision point P80.

Both the ejection port inclinations A71 and A72 have the same angle, and are set to 45 degrees, for example.

A remaining film thickness T6 of the ground conductor 60 located below the active gas buffer space 68 where the gas ejection ports 70(1) and 70(2) are provided is set to 3 mm, for example. A formation interval R70 between center positions of the gas ejection ports 70(1) and 70(2) in an uppermost portion is set to 16.4 mm, for example. The formation interval R70 coincides with a length of a diameter Φ of a virtual gas ejection port circle.

In the meanwhile, a whole depth DTA along the Z direction of the chassis opening part 41 is set to 18.5 mm, for example, and an upper side depth DT1 along the Z direction of the upper side region 41*a* in the chassis opening part 41 is set to 5.0 mm, for example.

A side surface of the lower side tapered region 41*t* as the tapered region of the chassis opening part 41 extends conically along a taper inclination A41. The taper inclination A41 is set to 45 degrees, for example.

In the ground conductor 60 having the above structure, upon the ejection of the pieces of partial active gas g2(1) and g2(2) from the gas ejection ports 70(1) and 70(2), the partial active gas g2(1) and the partial active gas g2(2) collide with each other at the collision point P80. As illustrated in FIG. 37, a formation depth of the collision point P80 from a surface of the ground conductor 60 is a collision depth DTX.

Even in a case where the total number of the gas ejection ports 70 is "three" or more, when each gas ejection port 70 is disposed along the virtual gas ejection port circle having the formation interval R70 as the diameter and an ejection port inclination A70 having the same value in the direction toward the collision point P80 is set, three or more pieces of partial active gas can be made to collide with each other at the same collision point P80. The ejection port inclination A70 is a collective term of the ejection port inclinations A71 and A72, for example.

The collision depth DTX of the collision point P80 is 5.2 mm in a setting example of the ejection port inclinations A71 and A72, the formation interval R70, the remaining film thickness T6, and the upper side depth DT1 described above.

In consideration of diameters of the gas ejection ports 70(1) and 70(2), the plural pieces of partial active gas collide with each other in the collision region 80 extending from the collision point P80 as the center. Accordingly, in the above example, the collision region 80 is formed from an upper portion region of the lower side tapered region 41*t* toward a lower portion region of the upper side region 41*a*. That is to say, the collision region 80 is located in the lower side tapered region 41*t* or in the upper side region 41*a* on an upper side of the lower side tapered region 41*t*.

(Ejection Form of Active Gas G2)

FIG. 38 to FIG. 41 are explanation diagrams each schematically illustrating an ejection form of the active gas G2 in the chassis opening part 41 in the electrode unit 55 according to the embodiment 2. Each of FIG. 38 to FIG. 41 corresponds to a part of a D-D cross section in FIG. 34. An XYZ rectangular coordinate system is illustrated in FIG. 38 to FIG. 41.

Hereinafter, an ejection direction of the partial active gas g2(1) ejected from the gas ejection port 70(1) is defined as a partial active gas ejection direction V7(1), and an ejection direction of the partial active gas g2(2) ejected from the gas ejection port 70(2) is defined as a partial active gas ejection direction V7(2).

Figure 38:
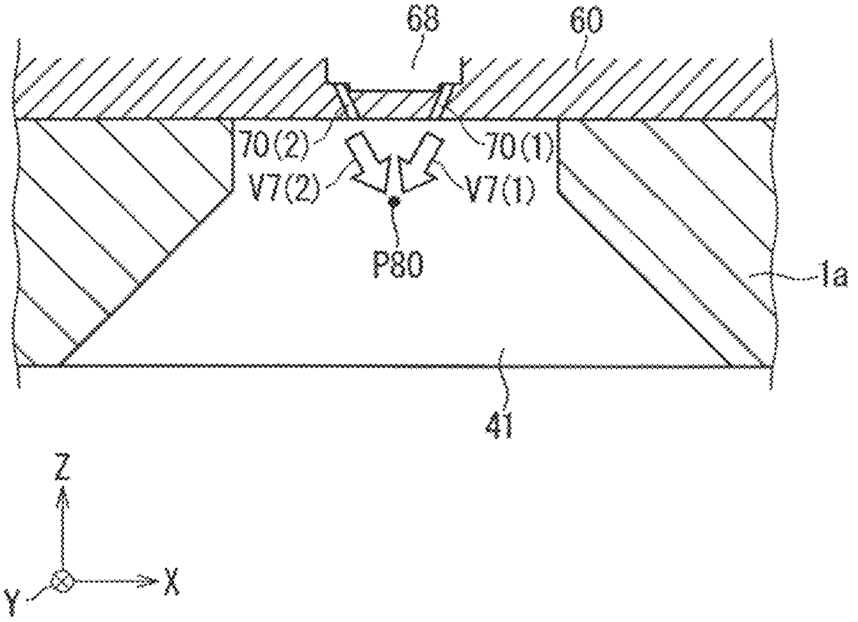
FIG. 38 is an explanation diagram (No. 1) illustrating an ejection form of active gas in a chassis opening part in an electrode unit according to the embodiment 2.

As illustrated in FIG. 38, the partial active gas g2(1) is ejected along the partial active gas ejection direction V7(1) to reach the collision point P80, and the partial active gas g2(2) is ejected along the partial active gas ejection direction V7(2) to reach the collision point P80.

That is to say, the direction of the flow of the partial active gas g2(1) is only one direction of the partial active gas ejection direction V7(1), and the direction of the flow of the partial active gas g2(2) is only one direction of the partial active gas ejection direction V7(2).

Figure 39:
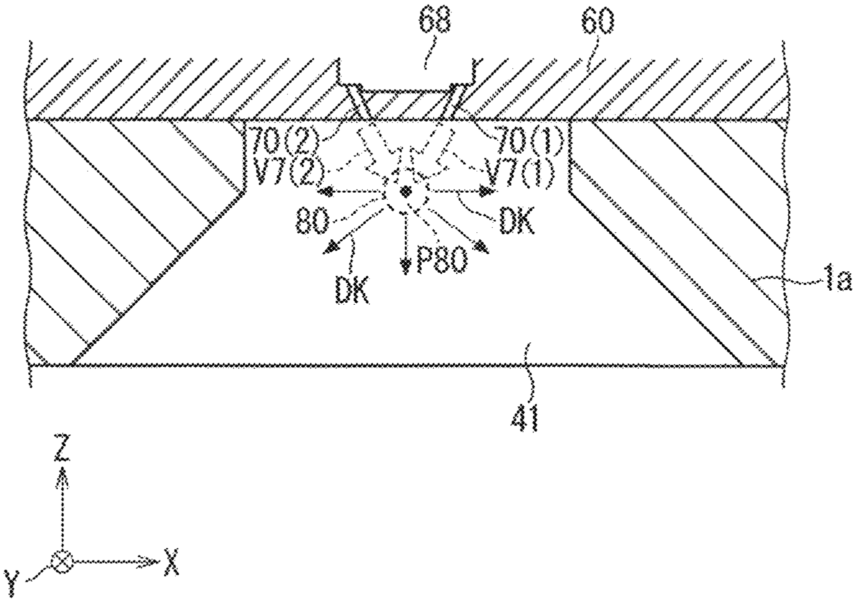
FIG. 39 is an explanation diagram (No. 2) illustrating an ejection form of active gas in the chassis opening part in the electrode unit according to the embodiment 2.

Subsequently, as illustrated in FIG. 39, the partial active gas g2(1) and the partial active gas g2(2) collides with each other in the collision region 80 including the collision point P80, and the pieces of partial active gas g2(1) and g2(2) are diffused in a plurality of diffusion directions DK.

That is to say, the direction of the flow of the partial active gas g2(1) is diffused to the plurality of diffusion directions DK from one partial active gas ejection direction V7(1), and the direction of the flow of the partial active gas g2(2) is diffused to the plurality of diffusion directions DK from one partial active gas ejection direction V7(2). In this manner, the direction of the flow of each of the plural pieces of active gas is diffused to the plurality of diffusion directions from one direction in the collision region 80.

Figure 40:
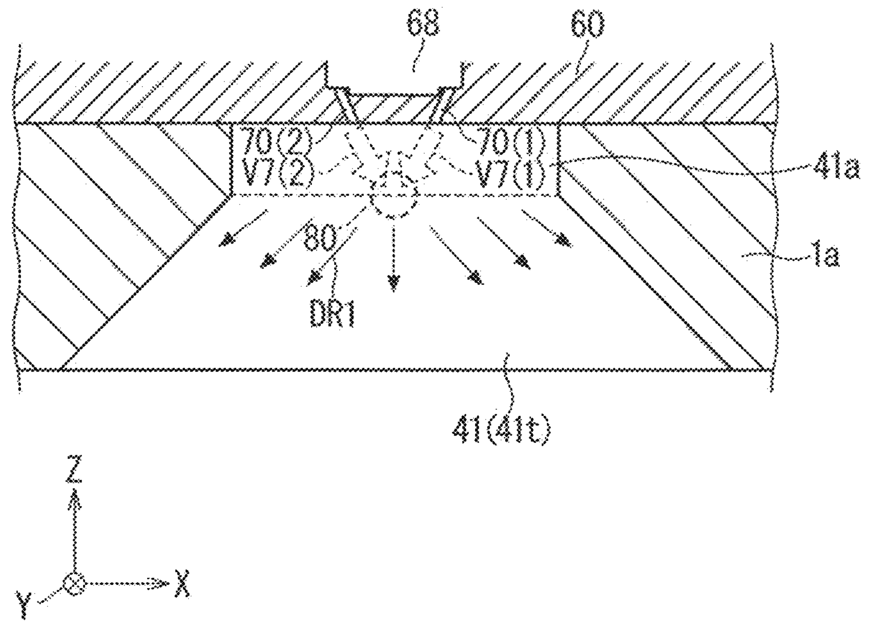
FIG. 40 is an explanation diagram (No. 3) illustrating an ejection form of active gas in the chassis opening part in the electrode unit according to the embodiment 2.

Then, as illustrated in FIG. 40, an intermediate supply direction DR1 of the plural pieces of partial active gas is regulated to be close to the taper inclination A41 under influence of the side surface of the lower side tapered region 41*t*.

In this manner, the collision region 80 is located in the lower side tapered region 41*t* and the upper side region 41*a* on the upper side of the lower side tapered region 41*t*, thus the plural pieces of partial active gas each diffused flows in the direction along the tapered shape of the side surface of the lower side tapered region 41*t* with decreasing distance to the lower side.

Figure 41:
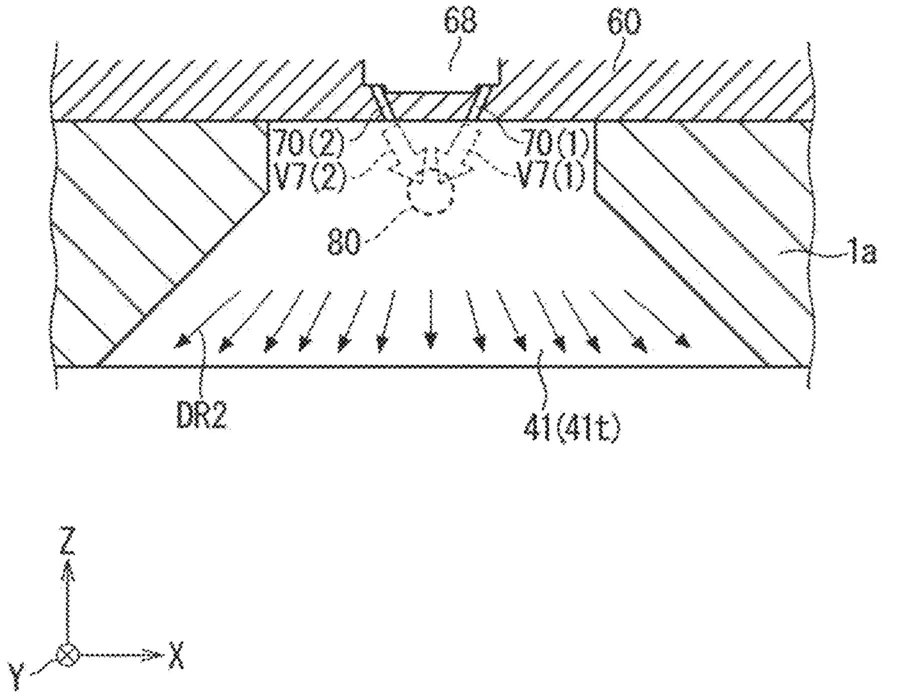
FIG. 41 is an explanation diagram (No. 4) illustrating an ejection form of active gas in the chassis opening part in the electrode unit according to the embodiment 2.

Subsequently, as illustrated in FIG. 41, the plural pieces of partial active gas are supplied to the processing space in the subsequent stage located on the lower side along a final supply direction DR2 of an extension along the taper inclination A41.

Effect

The active gas generation apparatus 75 according to the embodiment 2 having such a configuration has an effect similar to that according to the embodiment 1 and further has an effect described hereinafter specific to the embodiment 2.

The active ga generation apparatus 75 according to the embodiment 2 houses the electrode unit 55 including the ground conductor 60 described above in the chassis space 1S in the chassis 1. The plurality of gas ejection ports 70 provided in the ground conductor 60 of the electrode unit 55 according to the embodiment 2 are provided in a form of getting closer to each other with decreasing distance to the lower side so that the plural pieces of partial active gas collide with each other in the collision region 80 including the collision point P80, and the collision region 80 is located in the lower side tapered region 41*t* or on the upper side of the lower side tapered region 41*t*.

Thus, as illustrated in FIG. 39, the plural pieces of partial active gas collide with each other in the collision region 80, thus the direction of the flow of each of the plural pieces of active gas is diffused to the plurality of diffusion directions DK from one direction.

The collision region 80 is located in the lower side tapered region 41*t* or on the upper side of the lower side tapered region 41*t*. Thus, the plural pieces of partial active gas each diffused flows in the direction along the tapered shape of the side surface of the lower side tapered region 41*t*, that is to say, the intermediate supply direction DR1 illustrated in FIG. 40 with decreasing distance to the lower side.

Subsequently, the active gas G2 including the plural pieces of partial active gas is diffused and flows in the direction along the tapered shape of the side surface of the lower side tapered region 41*t*, that is to say, the final supply direction DR2 illustrated in FIG. 41 from the lower side tapered region 41*t* toward the processing space on the lower side.

In this manner, the plural pieces of partial active gas ejected from the plurality of gas ejection ports 70 flows in the chassis opening part 41 as illustrated in FIG. 38 to FIG. 41.

As a result, even when the spatial pressure p0 of the active gas buffer space 68 and spatial pressure p1 of the processing space in the subsequent stage are significantly different from each other, the active gas generation apparatus 75 according to the embodiment 1 can uniformly supply the active gas G2 to the processing space in the subsequent stage.

The plurality of gas ejection ports 70 provided to the electrode unit 55 according to the embodiment 2 are formed to be inclined in the direction close to the collision region 80 including the collision point P80 with decreasing distance to the lower side, and the ejection port inclination A70 as a formation inclination with respect to the horizontal direction as the reference direction of each of the plurality of gas ejection ports 70 is set to have the same value as each other.

Thus, even when the number of the gas ejection ports 70 is "three" or more, the plural pieces of partial active gas ejected from the plurality of gas ejection ports 70 can be made to collide with each other in the same collision region 80.

As a result, the active gas generation apparatus 75 according to the embodiment 2 diffuses the plural pieces of partial active gas in the plurality of diffusion directions in one collision region 80, thus can uniformly supply the active gas G2 toward the processing space in the subsequent stage.

Furthermore, applied to the active gas generation apparatus 75 according to the embodiment 2 is the structure in which the plurality of electrode units 55 are provided as the electrode units 51 to 53 as illustrated in FIG. 1.

Thus, the active gas generation apparatus 75 according to the embodiment 2 ejects the plural pieces of partial active gas from each of the plurality of electrode units 51 to 53 each having the structure similar to the electrode unit 55, thus can uniformly supply the active gas G2 to the processing space in the subsequent stage having the relatively large region.

The present disclosure is described in detail, however, the foregoing description is in all aspects illustrative, thus the present disclosure is not limited thereto. It is therefore understood that numerous modification examples not exemplified can be devised without departing from the scope of the present disclosure.

For example, the plural pieces of partial active gas are made to collide with each other in one collision region 80 in the embodiment 2, however, the plural pieces of partial active gas may be selectively made to collide with each other in two or more collision regions.

That is to say, each embodiment can be arbitrarily combined, or each embodiment can be appropriately varied or omitted within a scope of the present disclosure.

The invention claimed is:

1. An active gas generation apparatus activating material gas supplied to a discharge space to generate active gas, comprising:

an electrode unit; and a chassis housing the electrode unit in a chassis space and having conductivity, wherein the chassis includes a chassis bottom part including a flat surface and a conductor housing space concaved from the flat surface in a depth direction, the electrode unit includes:

a first electrode constituting part;

a second electrode constituting part provided to a lower side of the first electrode constituting part; and a reference potential conductor provided to a lower side of the second electrode constituting part to be housed in the conductor housing space, the first electrode constituting part includes a first electrode dielectric film and a first electrode conductive film formed on an upper surface of the first electrode dielectric film, the second electrode constituting part includes a second electrode dielectric film and a second electrode conductive film formed on a lower surface of the second electrode dielectric film, the reference potential conductor includes an active gas buffer space in an upper portion, and the second electrode constituting part is disposed to cover the active gas buffer space, the second electrode dielectric film includes a dielectric through port passing through the second electrode dielectric film in a region overlapped with the active gas buffer space in a plan view, and the second electrode conductive film includes a conductive film opening part in a region overlapped with the active gas buffer space in a plan view, the conductive film opening part is overlapped with the dielectric through port in a plan view, a space where the first electrode dielectric film and the second electrode dielectric film face each other is regulated as a main dielectric space, the discharge space includes a main discharge space as a region which the first and second electric conductive films are overlapped with each other in a plan view in the main dielectric space, alternating current voltage is applied to the first electrode conductive film, and the second electrode conductive film is set to have reference potential via the chassis and the reference potential conductor, the active gas generation apparatus further comprises a plurality of gas ejection ports each provided to pass through the reference potential conductor from a bottom surface of the active gas buffer space, the plurality of gas ejection ports not being overlapped with the dielectric through port in a plan view, the discharge space includes an auxiliary discharge space including the dielectric through port and a part of the active gas buffer space in addition to the main discharge space, active gas outputted from the plurality of gas ejection ports is regulated as plural pieces of partial active gas, the chassis bottom part of the chassis includes a chassis opening part in a region overlapped with the active gas buffer space in a plan view, and the plural pieces of partial active gas are introduced to a lower side through the chassis opening part, the chassis opening part includes a tapered region having a tapered shape with increasing opening area with decreasing distance to a lower side, and the plurality of gas ejection ports are provided to get closer to each other with decreasing distance to a lower side so that the plural pieces of partial active gas collide with each other in a collision region, and the collision region is located in the tapered region or on an upper side of the tapered region.

2. The active gas generation apparatus according to claim 1, wherein the plurality of gas ejection ports are formed to be inclined in a direction close to the collision region with decreasing distance to a lower side, and a formation inclination with respect to a reference direction of each of the plurality of gas ejection ports is set to have a same value as each other.

3. The active gas generation apparatus according to claim 1, wherein the electrode unit includes a plurality of electrode units, and the chassis houses the plurality of electrode units in the chassis space.

4. The active gas generation apparatus according to claim 1, further comprising a dielectric film support member provided on the flat surface of the chassis and including a support surface supporting the first electrode dielectric film from a lower side; and a dielectric film suppression member for suppressing the first electrode dielectric film from an upper side, the dielectric film suppression member not being overlapped with the first electrode conductive film in a plan view, wherein a lower surface of the dielectric film suppression member includes a dielectric contact region having contact with an upper surface of the first electrode dielectric film and a dielectric non-contact region not having contact with the upper surface of the first electrode dielectric film, the dielectric contact region is overlapped with a surrounding region of the first electrode dielectric film and the support surface of the dielectric film support member in a plan view, the dielectric non-contact region is overlapped with an intermediate region of the first electrode dielectric film in a plan view, and the intermediate region is a region adjacent to a side of the first electrode conductive film from the surrounding region, the dielectric film suppression member has conductivity and is set to have the reference potential, and the first electrode dielectric film is suppressed by the dielectric film suppression member from an upper side in the dielectric contact region.

* * * * *